US010081849B2

(12) United States Patent
Chaiko et al.

(10) Patent No.: US 10,081,849 B2
(45) Date of Patent: Sep. 25, 2018

(54) SYSTEM AND METHODS FOR OPTIMIZING THE EFFICIENCY OF SMELTING COPPER CONCENTRATES

(71) Applicant: FLSmidth A/S, Valby (DK)

(72) Inventors: David J. Chaiko, South Jordan, UT (US); Gary Roy, Salt Lake City, UT (US)

(73) Assignee: FLSMIDTH A/S, Valby (DK)

( * ) Notice: Subject to any disclaimer, the term of this patent is extended or adjusted under 35 U.S.C. 154(b) by 0 days.

(21) Appl. No.: 15/502,142

(22) PCT Filed: Aug. 11, 2015

(86) PCT No.: PCT/US2015/044674
§ 371 (c)(1),
(2) Date: Feb. 6, 2017

(87) PCT Pub. No.: WO2016/025492
PCT Pub. Date: Feb. 18, 2016

(65) Prior Publication Data
US 2017/0226611 A1 Aug. 10, 2017

Related U.S. Application Data

(60) Provisional application No. 62/036,038, filed on Aug. 11, 2014.

(51) Int. Cl.
*C22B 15/00* (2006.01)
*F27D 21/00* (2006.01)

(52) U.S. Cl.
CPC ........ *C22B 15/0095* (2013.01); *C22B 15/006* (2013.01); *C22B 15/0028* (2013.01); *C22B 15/0063* (2013.01); *F27D 21/0014* (2013.01)

(58) Field of Classification Search
CPC .......... C22B 15/0095; C22B 15/00028; C22B 15/0063; C22B 15/0028
See application file for complete search history.

(56) References Cited

U.S. PATENT DOCUMENTS 4,152,142 A * 5/1979 Schlitt, III .......... C22B 15/0071
205/583
5,316,567 A * 5/1994 Jones ........................ C22B 3/06
423/24

(Continued)

FOREIGN PATENT DOCUMENTS

CA        2842257 A1 *  1/2013
WO   WO-2005007905 A1 *  1/2005 ......... C22B 15/0047

(Continued)

OTHER PUBLICATIONS

Bartolacci, Gianni et al. "Application of Numerical Image Analysis to Process Diagnosis and Physical Parameter Measurement in Mineral Processes—Part I: Flotation Control Based on Froth Textural Characteristics." Minerals Engineering 19 p. 734-747. Elsevier. www.sciencedirect.com (Year: 2006).*

(Continued)

*Primary Examiner* — George Wyszomierski
*Assistant Examiner* — Tima M McGuthry-Banks
(74) *Attorney, Agent, or Firm* — Jeffrey A. Sharp; Matthew R. Weaver; Daniel DeJoseph

(57) ABSTRACT

A method of operating a concentrator may comprise producing a final copper concentrate and periodically or continuously analyzing the produced final copper concentrate to obtain a grade value of the produced final copper concentrate. The produced final copper concentrate may be sent to a downstream smelting operation if/when the grade value of the produced final copper concentrate is at or above a minimum acceptable grade threshold and may be sent to a downstream hydrometallurgical operation capable of pro- (Continued)

ducing copper cathode, if/when the grade value of the produced final copper concentrate is below or falls below the minimum acceptable grade threshold.

5 Claims, 15 Drawing Sheets

(56) References Cited

U.S. PATENT DOCUMENTS

| | | |
|---|---|---|
| 2002/0044899 A1 | 4/2002 | Marsden et al. |
| 2003/0192404 A1* | 10/2003 | Jones .................... C22B 3/0005 75/744 |
| 2006/0207389 A1 | 11/2006 | Heimala et al. |
| 2008/0173132 A1* | 7/2008 | Dunn ................. C22B 15/0008 75/399 |
| 2011/0182786 A1 | 7/2011 | Burba, III |
| 2013/0201481 A1 | 8/2013 | Bamber et al. |
| 2014/0260801 A1* | 9/2014 | Wellwood ............. B07C 5/3427 75/392 |
| 2014/0260802 A1* | 9/2014 | Kingman ............... G01N 21/85 75/392 |

FOREIGN PATENT DOCUMENTS

| | | |
|---|---|---|
| WO | 2011067680 A2 | 6/2011 |
| WO | 2016025492 | 2/2016 |

OTHER PUBLICATIONS

International Search Report and Written Opinion (dated Mar. 24, 2016).

Glenn Barr, Jennifer Defreyne, David Jones, R Mean, Company: CESL; On-Site Processing vs. Sale of Copper Concentrates, May 19, 2005, ALTA 2005, Perth, WA, Australia.

Rohner, Hydrometallurgical Options to Add Value to Copper Projects and Operations, Mar. 24, 2010 Core Resources, Brisbane, Australia; www.coreresources.com.au.

* cited by examiner

Simulated Plant Production Data for One Month

| Tonne Concentrate | %Cu | Tonne Cu | Tonne ore processed | $/tonne concentrate produced |
|---|---|---|---|---|
| 583 | 20.66 | 120.45 | | $ 282.56 |
| 478 | 22.17 | 105.97 | | $ 279.31 |
| 409 | 20.24 | 82.78 | | $ 373.45 |
| 518 | 21.51 | 111.42 | | $ 271.77 |
| 511 | 21.36 | 109.15 | | $ 259.64 |
| 129 | 25.23 | 32.55 | | $ 332.06 |
| 354 | 24.27 | 85.92 | | $ 315.28 |
| 400 | 24.96 | 99.84 | | $ 365.94 |
| 441 | 22.76 | 100.37 | | $ 248.29 |
| 42 | 22.42 | 9.42 | | $ 231.43 |
| 10 | 22.42 | 2.24 | | $ 222.40 |
| 118 | 22.42 | 26.46 | | $ 231.86 |
| 507 | 23 | 116.61 | | $ 282.73 |
| 600 | 21.87 | 131.22 | | $ 257.55 |
| 397 | 34.46 | 136.81 | | $ 483.21 |
| 715 | 22.34 | 159.73 | | $ 286.62 |
| 549 | 19.8 | 108.70 | | $ 280.94 |
| 482 | 19.38 | 93.41 | | $ 320.68 |
| 591 | 18.87 | 111.52 | | $ 274.20 |
| 301 | 16.18 | 48.70 | | $ 417.48 |
| 533 | 17.21 | 91.73 | | $ 226.59 |
| 444 | 14.76 | 65.53 | | $ 261.39 |
| 680 | 12.72 | 86.50 | | $ 182.68 |
| 463 | 11.64 | 53.89 | | $ 308.43 |
| 366 | 13.15 | 48.13 | | $ 391.05 |
| | 20.% ave. grade | 2,139.06 | | $ 295.90 |

Figure 5

Concentrate Grade as a Function of Setting a Predetermined minimum grade threshold (% Cu)

| Predetermined minimum grade threshold (% Cu) | Total Combined Average Grade of Concentrate Going to Smelter (%Cu) | Average Grade of Concentrate Going to Downstream Hydrometallurgical Circuit (%Cu) |
|---|---|---|
| 0 | 20.14 | |
| 12 | 20.53 | 11.64 |
| 14 | 21.41 | 12.49 |
| 15 | 21.75 | 13.01 |
| 16 | 21.75 | 13.01 |
| 18 | 22.27 | 14.15 |
| 19 | 22.55 | 14.98 |
| 20 | 23.03 | 16.06 |
| 22 | 24.39 | 17.97 |
| 24 | 27.74 | 19.10 |

Figure 6

SYSTEM AND METHODS FOR OPTIMIZING THE EFFICIENCY OF SMELTING COPPER CONCENTRATES

CROSS-REFERENCE TO RELATED APPLICATIONS

This application claims priority to and/or the benefit of U.S. Provisional Patent Application No. 62/036,038, filed on 11 Aug. 2014, which is titled: "SYSTEM FOR OPTIMIZING EFFICIENCY OF SMELTING COPPER CONCENTRATES, AND METHODS THEREOF", and is hereby incorporated by reference in its entirety for any and all purposes as if fully set forth herein.

FIELD OF THE INVENTION

Embodiments of this invention relate to equipment and processes for improving copper extraction circuits which may be located downstream of a copper concentrator, and more particularly to systems and methods for maximizing profits and economic benefit from mined ore bodies and copper concentrate produced by copper concentrators. Even more particularly, embodiments of the invention relate to a system having both separate downstream smelting and hydrometallurgical processing circuits as part of the same overall copper extraction and recovery circuit, wherein produced copper concentrate formed by a copper concentrator may be provided, by way of sorting (e.g., using diverter means), to either one of the separate downstream smelting and hydrometallurgical processing circuits; for example, as a function of the grade of a produced copper concentrate over time, or, as a function of impurity concentration level within the produced copper concentrate over time. Various methods and equipment for combining such separate downstream smelting and hydrometallurgical processing circuits and for the treatment of copper concentrates via intermittently switching the flow of the produced copper concentrate between the separate downstream smelting and hydrometallurgical processing circuits are further disclosed.

BACKGROUND OF THE INVENTION

As the quality of ore bodies slowly declines and environmental regulations continue to increase, copper producers face challenges with remaining profitable. For example, many producers of copper concentrate rely on a smelter contract, in order to get paid for copper concentrates they produce. Further adding to the challenges and complexities with the business models of copper producers, is that the term of a smelter contract may typically only extend for one year; and therefore, it may not be uncommon for a smelter contract to be re-negotiated annually. Such frequent changes of contract terms regarding minimum acceptable grade of received concentrate and/or maximum acceptable impurity concentration levels leaves copper concentrate producers with continued questions and uncertainties regarding to expected revenue and profitability forecasts.

Smelter contract penalties generally apply to concentrates having a low grade (e.g., low % copper concentration) and/or to concentrates comprising too much of one or more deleterious elements that might be considered to be toxic, considered to be expensive to dispose of, considered to be contaminants to the principal metal to be recovered, considered to present risks to the occupational health of smelter workers, considered to increase environmental disposal costs, considered to reduce copper quality, and/or which may be considered to be difficult to separate or remove. For example, elements including, but not limited to lead, arsenic, cadmium, mercury, and fluorine, which may be present in concentrations, and/or which exceed specified levels defined within the terms of a smelter contract, may incur financial penalties for a concentrator operation selling or further processing its produced final copper concentrate. Moreover, if some elements are found to be high enough in concentration within a produced final copper concentrate, the concentrate may not even be saleable.

Current and past methods which have been disclosed or used by copper concentrators focus on pre-sorting run of mine (ROM) material, in order to maximize the copper grade of the ROM material being fed into the concentrator. In this regard, it is conventionally believed that the expensive reagents, power (e.g., for grinding the ROM material), and water used to extract target metals from ROM material to produce a final copper concentrate product could be more efficiently used by treating only the copper rich portion(s) of a mine which produce copper-rich ROM material. While the concept of pre-sorting ROM material might work in principle, commercially-viable/feasible/practical working embodiments of such techniques do not currently exist. In particular, ROM material pre-sorting technologies which might be able to be used to perform the ore sorting at the level of tonnage required, or, to make the practice of such a method profitable, do not currently exist. Moreover, the large size of most ROM material makes thorough compositional analysis difficult at best.

In addition to pre-sorting incoming ROM material, prior art methods, such as the one described in U.S. Pat. No. 1,808,547 (hereinafter, "the '547 patent") suggest that a concentrator should be operated to simultaneously produce both a high-grade product, and a low-grade product, along with a tailings fraction; wherein a general concentrate is divided into a high-grade concentrate and a low-grade concentrate for simultaneous parallel treatment (page 6, lines 74-75). Accordingly, such a downstream circuit handling low grade concentrate production would necessarily need to be much larger than a downstream circuit used to produce a small amount of very high grade concentrate. In addition, the '547 patent suggests minimizing the amount of material that is to be smelted (page 6, lines 40-41). Accordingly, prior art methods essentially teach away from economical smelting operations which only move a general concentrate to a downstream hydromet circuit on low grade production days. Moreover, prior art methods fail to teach or suggest the concept of intermittently diverting a general concentrate between two downstream processes—for example, as a function of the contents of the general concentrate (e.g., grade or impurity content).

Additional prior art methods have been developed in an attempt to increase profits to copper concentrators. For example, Galvanox™ technology (as discussed in "Galvanox™—An Opportunity for Existing Copper Flotation Concentrators to Improve Overall Project Economics", Linus Sylwestrzak, Ken Baxter, John Turney, and David Dixon, in Hydrocopper 2009, Antofagasta, Chile, pp. 17-25) suggests means for increasing profits to the concentrator comprising altering the upstream flotation circuit within a concentrator, in an effort to maximize the copper grade of produced concentrates which are destined to be sent to a smelter. It is taught that a copper concentrator might increase its overall copper recovery by leaching cleaner tails—which, according to the aforementioned publication, could be more enriched in copper as a result of the altered upstream flotation circuit within the concentrator. In this latter approach, as with the '547 patent, the major component of the profit is derived from hydrometallurgical processing, and not from smelting. Furthermore, these prior art teachings seem to suggest that existing concentrator operations, particularly the upstream flotation circuit and/or portions thereof within the concentrator, would necessarily have to be substantially altered in order to practice the methods and enjoy the benefits of the methods. Accordingly, with prior methods, a concentrator operation may have to modify is infrastructure (i.e., the upstream equipment, flowsheets, and process conditions which are necessary to produce a final copper concentrate product) in order to allow the concentrator to produce two distinct, and separate product streams simultaneously, in parallel.

In concentrators where the concentrator feed (i.e., crushed ROM material) comes from deposits with large mineralogical variability, the copper grade of the produced final concentrate product can be highly variable and fluctuate regularly. Accordingly, efforts to maintain a target final product grade (i.e., according to a minimum acceptable grade value outlined in a smelter contract) can be costly. It may not be uncommon or impossible for final produced concentrate product having copper concentrations as low as 10% (i.e., poor grade concentrate) to make its way to a smelter on certain production days during the operation of a concentrator. Moreover, final produced concentrate product having as much as 35% copper could make its way to a smelter on better production days. The number of penalties associated with a few bad concentrate production days (e.g., due to ROM material composition fluctuations) may ultimately compromise bottom dollar economics and/or profitability of a concentrator that sells its copper-containing concentrate product to a smelter.

There exists a long-felt need to provide a simple process solution which would allow a concentrator operation to continue to enjoy the continued economic benefits of smelting, without incurring excessive penalties associated with low grade concentrate production days and/or days where smelter feeds exceed maximum allowable impurity threshold(s), without necessarily modifying upstream concentrator operations (e.g., flotation circuit components and/or chemistry), all while still minimizing capital expenditures (CAPEX) and investments which are typically involved in converting an existing smelting operation entirely over to a hydrometallurgical process.

OBJECTS OF THE INVENTION

It is, therefore, an object of some embodiments of the present invention to improve and/or maximize the profits of mining and/or concentrator operations, particularly profits which are made from the production of copper concentrates which are to be used as a smelter feed.

It is also an object of some embodiments of the present invention to minimize disruption to existing upstream concentrator operations, processes, and/or infrastructure, particularly flotation circuits and/or chemistries which could have cost implications and/or technical downstream implications.

It is also an object of some embodiments of the present invention to minimize and/or eliminate risks associated with altering existing concentrator flotation processes, for example, by allowing an existing upstream concentrator to operate conventionally, without any changes or without significant changes to the existing equipment, reagents, or process.

It is also an object of some embodiments of the present invention to maintain a smelter feed concentrate product as a major contributor of the concentrator's profit, i.e., wherein a majority of produced final copper concentrate product may still be intended for a smelter, and a hydromet circuit is provided to handle the concentrate product on poor grade and/or high impurity production days.

It is a further object of some embodiments of the present invention to improve economic returns and/or to maximize the profits of a mining or copper concentrator operation, while only having to continue to produce a single (i.e., "one") copper concentrate product (e.g., a "final concentrate"); rather than produce double (i.e., "two") copper concentrate product streams (e.g., a "high grade concentrate" and a "low grade concentrate") to be processed in parallel.

It is a further object of some embodiments of the present invention to improve economic returns and/or maximize profits to a mining or copper concentrator operation, by increasing copper recovery at the expense of lowering the average grade of a final concentrate product, wherein a composition of the produced final concentrate product going to a smelter may be controlled by: analyzing produced final concentrate product leaving the mining or copper concentrator operation; moving the produced final concentrate product having a low copper grade to a hydromet process, thereby separating it from a smelter feed; and, moving the produced final concentrate product from feeding the hydromet process to feeding the smelter if the copper grade of the produced final concentrate product exceeds a minimum acceptable threshold.

It is a further object of some embodiments of the present invention to improve economic returns and maximize profits for a mining or copper concentrator operation, wherein variations or inconsistencies in produced concentrate grade (for example, as a consequence of variability in ROM material feed compositions), may not severely negatively impact the economics of a copper concentrator or mining operation.

It is a further object of some embodiments of the present invention to improve economic returns and maximize profits for a mining or copper concentrator operation, wherein variations, inconsistencies, or increases in the amount of impurities found within the produced concentrate (for example, as a consequence of variability in ROM material feed compositions), may not negatively impact the economics of a copper concentrator or mining operation.

It is a further object of some embodiments of the present invention to provide a downstream copper recovery circuit wherein at least the majority of a concentrator's final copper concentrate product produced, which meets and/or exceeds a minimum acceptable grade threshold and/or which falls below a maximum impurities threshold, may be sent directly to a smelter.

It is a further object of some embodiments of the present invention to provide a downstream copper recovery circuit wherein a relatively minor portion of a concentrator's final copper concentrate product produced, which does not meet and/or exceed a minimum acceptable grade threshold and/or which falls above a maximum impurities threshold, may be sent directly to a downstream hydrometallurgical circuit for treatment; wherein the downstream hydrometallurgical circuit may include a solvent extraction circuit and/or an electrowinning circuit which may be configured to produce saleable copper.

It is a further object of some embodiments of the present invention to reduce, eliminate, or mitigate financial penalties that may be incurred by mines or concentrator operations that treat or extract ROM ore material from highly variable mineral deposits and rely on downstream smelting to extract value from concentrates.

Another object of some embodiments of the present invention is to stabilize concentrator economics independently, without the need to strive to produce a final copper concentrate product which has a very consistent grade, and/or without the need to produce a final copper concentrate product which is always economically saleable to a smelter.

These and other objects of the present invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A method of operating a copper concentrator is disclosed. According to some embodiments, the method may comprise the step of (a) producing a final copper concentrate via a concentrator. According to some embodiments, the method may further comprise the step of (b) analyzing the produced final copper concentrate to obtain a grade value of the produced final copper concentrate. According to some embodiments, the method may further comprise the step of (c) diverting the produced final copper concentrate to a downstream smelting operation if the grade value of the produced final copper concentrate is at or above or exceeds a minimum grade threshold, or instead diverting the produced final copper concentrate to a downstream hydrometallurgical operation capable of producing copper cathode from the produced final copper concentrate, if the grade value of the produced final copper concentrate is below or falls below said minimum grade threshold. According to some embodiments, the minimum grade threshold may be selected to be approximately 22%, without limitation. According to some embodiments, the minimum grade threshold may be selected to be between approximately 10 and 25%, without limitation. According to some embodiments, the minimum grade threshold may be selected to be between approximately 15 and 25%. According to some embodiments, the minimum grade threshold may be selected to be between approximately 11 and 21%. According to some embodiments, the minimum grade threshold may be selected to be between approximately 17 and 23%. According to some embodiments, the minimum grade threshold may be selected to be between approximately 18 and 22%, for example, 19%, without limitation. It is anticipated by the inventors that the minimum grade threshold may change over time, as smelter contracts and environmental regulations evolve.

According to some embodiments, the minimum grade threshold may comprise a minimum acceptable grade threshold which can be calculated based upon terms of a smelter contract, for example, a smelter contract which may be associated with said downstream smelting operation. According to some embodiments, the step of producing a final copper concentrate via the concentrator may comprise producing a final copper concentrate from an incoming ore body feed stream, wherein the ore body feed stream may comprise a mineralogy which varies over time. According to some embodiments, the step of diverting the produced final copper concentrate may occur as a function of time, or diversion may occur as a function of a percent change in the mineralogy of the ore body feed stream, without limitation. According to some embodiments, the method may comprise the step of determining the percent change in the mineralogy of the ore body feed stream, for example, by approximating a first origin location of the ore body forming the ore body feed stream, and assigning a first approximate composition to the ore body forming the ore body feed stream using core sample mineralogy data and core sample location data associated with a mine plan, without limitation. According to some embodiments, the step of determining the percent change in the mineralogy of the ore body feed stream may further comprise waiting for a period of time, approximating a second origin location of the ore body forming the ore body feed stream after the period of time has lapsed, assigning a second approximate composition to the ore body forming the ore body feed stream after the period of time has lapsed using core sample mineralogy data and core sample location data associated with a mine plan and the approximated second origin location, and comparing the first approximate composition with the second approximate composition (e.g., after the period of time has lapsed), without limitation. Such methods may be used to forecast an anticipated percent change in the mineralogy of the ore body feed stream (e.g., prior to the expiration of the period of time), without limitation. According to some embodiments, the percent change in the mineralogy may be determined from one or more analyzers which may be configured to detect relative changes in mineralogy of the ore body feed stream.

According to some embodiments, the step of diverting the produced final copper concentrate may comprise: diverting most of the produced final copper concentrate to a downstream smelting operation for a first period of time when the grade value of the produced final copper concentrate is at or above or exceeds the minimum grade threshold; and diverting most of the produced final copper concentrate to a downstream hydrometallurgical operation capable of producing copper cathode from the produced final copper concentrate for a second period of time, when the grade value of the produced final copper concentrate is below or falls below said minimum grade threshold. The step of diverting the produced final copper concentrate may comprise, without limitation, diverting substantially all or all (e.g., sans negligible or residual flow or leakage) of the produced final copper concentrate to a downstream smelting operation for a first period of time when the grade value of the produced final copper concentrate is at or above or exceeds the minimum grade threshold; and diverting substantially all or all (e.g., sans negligible or residual flow or leakage) of the produced final copper concentrate to a downstream hydrometallurgical operation capable of producing copper cathode from the produced final copper concentrate for a second period of time, when the grade value of the produced final copper concentrate is below or falls below said minimum grade threshold.

According to some embodiments, the method may further comprise the step of diverting most, substantially all, or all of the produced final copper concentrate back to the downstream smelting operation from the downstream hydrometallurgical operation for a third period of time, when or after the grade value of the produced final copper concentrate is at or above or exceeds or increases to or rises above the minimum grade threshold. According to some embodiments, the method may further comprise the step of diverting most, substantially all, or all of the produced final copper concentrate back to the hydrometallurgical operation for a fourth period of time, when or after the grade value of the produced final copper concentrate is below or falls below the minimum grade threshold.

According to some embodiments, the first period of time, the second period of time, the third period of time, and the fourth period of time may be determined from the grade value, for example, the grade value obtained during the step of analyzing the produced final copper concentrate. According to some embodiments, the step of analyzing the produced final copper concentrate to obtain a grade value of the produced final copper concentrate may be performed periodically; for example, may be performed at least every year, at least every month, at least every week, at least every day, at least a plurality of times each day, every few hours, or every few minutes, without limitation. The step of producing a final copper concentrate via the concentrator may comprise producing a final copper concentrate from an incoming ore body feed stream, wherein the ore body feed stream may comprise a mineralogy which varies over time. The step of analyzing the produced final copper concentrate may be performed periodically, for example, as a function of time, or as a function of a percent change in the mineralogy of the ore body feed stream, without limitation. In yet further alternative embodiments, rather than using automated analyzing techniques which may involve automated sampling or assaying techniques, the step of analyzing the produced final copper concentrate may be performed manually, for example, assaying concentrate at scheduled times. The scheduled times may complement a mine plan or may compliment ROM material extraction techniques and processing schedules thereof.

In some embodiments, the percent change in the mineralogy of the ore body feed stream may be determined from one or more of the group consisting of: a mine location or approximate mine location associated with an origin of the ore body forming the incoming ore body feed stream, core sample mineralogy data and core sample location data associated with a mine plan, and one or more analyzers which are configured to detect a mineralogy (e.g., a mineralogical compositional makeup, a chemical compositional makeup, or a material characterization) of the incoming ore body feed stream, without limitation. Moreover, the step of diverting the produced final copper concentrate may comprise switching the flow of the produced final copper concentrate back and forth between a downstream hydrometallurgical operation and downstream smelting operation. Furthermore, the step of switching the flow of the produced final copper concentrate between said downstream hydrometallurgical operation and said downstream smelting operation may be performed less than or equal to the number of times the produced final copper concentrate is analyzed in step (b). According to some embodiments, the step of switching the flow of the produced final copper concentrate between said downstream hydrometallurgical operation and said downstream smelting operation may be performed at least every year, performed at least every month, performed at least every week, performed at least every day, performed at least a plurality of times each day, performed every few hours, or performed every few minutes, without limitation. According to some embodiments, the diverting step (c) may be performed periodically, for example, as a function of time, without limitation.

A copper concentrator is further disclosed. According to some embodiments, the copper concentrator may comprise: (a) a flotation circuit or a gravity separation circuit for producing a stream of final copper concentrate; (b) an analyzer for periodically analyzing the produced final copper concentrate to obtain a grade value of the produced final copper concentrate; (c) a diverter configured to control a flow of the stream of produced final copper concentrate produced by the copper concentrator; and, (d) a downstream hydrometallurgical circuit adapted to further process the produced final copper concentrate into copper cathode. In some preferred embodiments, the diverter may comprise a mechanism which may be configured to divert the stream of produced final copper concentrate to a downstream smelting operation, for example, if the grade value of the produced final copper concentrate is at or above or exceeds a minimum grade threshold. The diverter mechanism may further be configured to divert the stream of produced final copper concentrate to said downstream hydrometallurgical circuit, for example, if the grade value of the produced final copper concentrate is below or falls below said minimum grade threshold. The diverter may be configured to divert most or all of the stream of produced final copper concentrate back and forth between the downstream smelting operation and the downstream hydrometallurgical circuit over time; for example, as the grade value of the produced final copper concentrate fluctuates over time. According to some embodiments, the minimum grade threshold may fall approximately between 10% and 25%, for example, approximately between 11% and 21%, without limitation. According to some embodiments, the analyzer for periodically analyzing the produced final copper concentrate may be advantageously configured to analyze the produced final copper concentrate at least every year, at least every month, at least every week, at least every day, at least a plurality of times each day, every few hours, or every few minutes, without limitation. The analyzer may be configured to assay the produced final copper concentrate automatically (e.g., via an automated sampling technique, on-line analyzer, in-line analyzer, or the like), or manual assaying may be periodically performed using an analyzer, and the diverter may be manually-controlled based on the assaying results, without limitation. According to some embodiments, the diverter may be configured to divert the produced final copper concentrate to said downstream smelting operation or said downstream hydrometallurgical circuit by switching the flow direction of the stream of produced final copper concentrate from said downstream hydrometallurgical operation to said downstream smelting operation, or vice-versa, without limitation.

According to some embodiments, the diverter may be capable of switching the flow direction of the stream a number of times which is less than or an equal to the number of times the produced final copper concentrate is analyzed by the analyzer. According to some embodiments, the diverter may be capable of switching the flow direction of the stream approximately simultaneously with, or just after the produced final copper concentrate is analyzed by said analyzer. According to some embodiments, the diverter may be capable of switching the flow direction of the stream, between said downstream hydrometallurgical operation and said downstream smelting operation at least every year, at least every month, at least every week, at least every day, or at least a plurality of times each day, for example every few hours, or every few minutes, without limitation. As previously stated, the diverter may be configured for manual or automated switching, without limitation.

A method of operating a metal sulfide concentrator is also disclosed. According to some embodiments, the metal sulfide concentrator may comprise a flotation circuit and/or a thickener. The method may comprise the step of (a) producing a metal concentrate from an incoming ore body stream, wherein the ore body stream may comprise an ore body, and the ore body may have a mineralogy which may vary over time. The method may further comprise the step of (b) determining a minimum acceptable grade threshold and/or a maximum acceptable impurity concentration threshold which offers a satisfactory economic return in accordance with a smelter contract. The method may further include the step of (c) analyzing the produced metal concentrate so as to obtain a grade value and/or an impurity concentration level of the produced metal concentrate. According to some embodiments, the method may further comprise the step of (c) diverting substantially all of the produced metal concentrate to a downstream smelting operation if the grade value of the produced metal concentrate is at or above or exceeds the minimum acceptable grade threshold and/or if the impurity concentration level of the produced metal concentrate is below or falls below the maximum acceptable impurity concentration threshold. Rather than diverting substantially all of the produced metal concentrate to a downstream smelting operation, step (c) may alternatively comprise the step of diverting the produced metal concentrate to a downstream hydrometallurgical operation, if the grade value of the produced metal concentrate is below or falls below said minimum acceptable grade threshold and/or if the impurity concentration level of the produced metal concentrate is at or above or exceeds the maximum acceptable impurity concentration threshold, without limitation. According to some embodiments, the maximum acceptable impurity concentration level may comprise a maximum acceptable arsenic concentration level between 0.01% to 1%. According to some embodiments, the maximum acceptable impurity concentration level may comprise a maximum acceptable arsenic concentration level of approximately 0.5%.

Methods for improving the recovery of a metal using a sulfide concentrator without incurring smelter penalties, is further disclosed (see FIGS. 11 and 12). According to some embodiments, the method may comprise the step of (a) producing a metal sulfide concentrate in a sulfide concentrator. The produced metal sulfide concentrate may have a single grade value on a single grade vs. recovery curve, and may have a single % recovery value on said single grade vs. recovery curve. The method may further comprise the step of (b) analyzing the produced metal sulfide concentrate. The method may further comprise the step of (c) sending the produced metal sulfide concentrate to either a smelting operation or a hydromet operation downstream of the sulfide concentrator based upon the single grade value. By virtue of steps (b) and (c), the method may further include the step of (d) separating the single grade vs. recovery curve into a first grade vs. recovery curve and a second grade vs. recovery curve; the first grade vs. recovery curve representing a first aggregate portion of the produced sulfide concentrate which is destined for a downstream smelter operation; the second grade vs. recovery curve representing a second aggregate portion of the produced sulfide concentrate which is destined for a downstream hydrometallurgical operation; a first grade value on the first grade vs. recovery curve being greater than said single grade value; a first % recovery value on the first grade vs. recovery curve being less than said single % recovery value; a second grade value on the second grade vs. recovery curve being less than said single grade value; and a second % recovery value being less than said single % recovery value. According to some embodiments, the method may further comprise the steps of (e) increasing the first % recovery value and the second % recovery value by "pulling harder" in the sulfide concentrator, and/or (f) decreasing the first grade value and the second grade value by "pulling harder" in the sulfide concentrator, without limitation.

BRIEF DESCRIPTION OF THE DRAWINGS

To complement the description which is being made, and for the purpose of aiding to better understand the features of the invention, a set of drawings illustrating exemplary apparatus and methods is attached to the present specification as an integral part thereof, in which the following has been depicted with an illustrative and non-limiting character. It should be understood that like reference numbers used in the drawings may identify like components.

FIG. 5 is a table showing a hypothetical, illustrative, and non-limiting example of simulated plant production data over the course of a month. For example, hypothetical produced final copper concentrate grade values, and hypothetical U.S. dollars per tonne of final copper concentrate produced are shown; wherein the log data may be advantageously utilized in an algorithm executed via software provided to a computing device. The algorithm may be executed in order to determine if and/or when diverter means may be activated to change the directional course of the produced final copper concentrate to a downstream hydrometallurgical process from a downstream smelting process, or to a downstream smelting process from a downstream hydrometallurgical process, without limitation.

FIG. 6 is a hypothetical, illustrative, and non-limiting table showing the effect on the produced final copper concentrate grade value (% copper) as a function of minimum acceptable grade threshold (% copper), according to some non-limiting embodiments, wherein the minimum acceptable grade threshold may be adjusted and/or set to affect diverter means and a change path of the produced final copper concentrate product.

Figure 1:
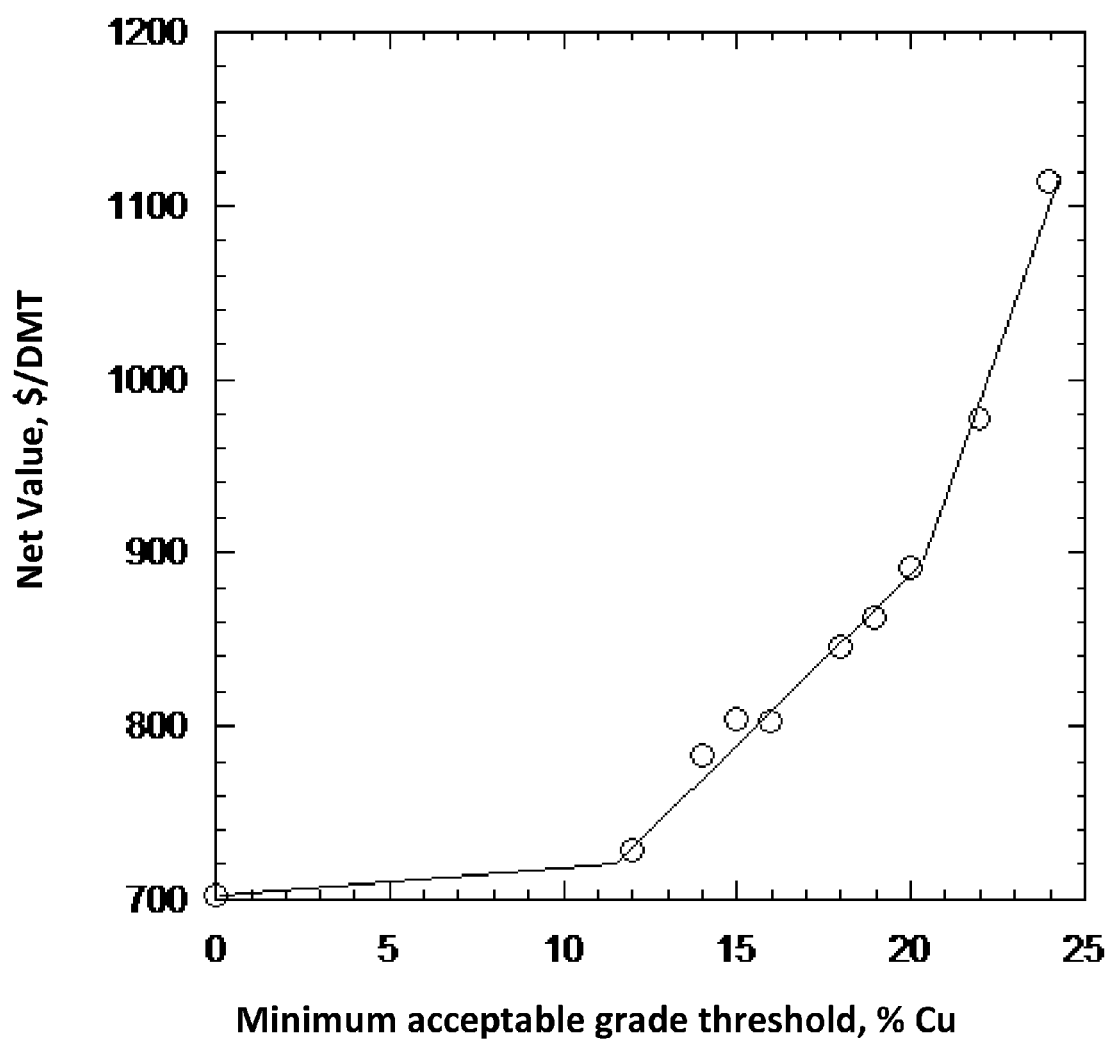
FIG. 1 is a hypothetical, illustrative, and non-limiting graph showing an example of Net Value (NV) to a concentrator operation per Dry Metric Ton (DMT) of produced final copper concentrate that may be smelted onsite or shipped to a smelter, as a function of minimum acceptable grade threshold (% copper), according to some embodiments; wherein the minimum acceptable grade threshold may be adjusted and/or set to affect diverter means.

In the following, the invention will be described in more detail with reference to drawings in conjunction with exemplary embodiments.

DETAILED DESCRIPTION OF THE INVENTION

The following description of the non-limiting embodiments shown in the drawings is merely exemplary in nature and is in no way intended to limit the inventions disclosed herein, their applications, or uses.

According to some embodiments, a system and method of handling produced concentrate, such as a produced final copper concentrate is provided. In preferred embodiments, the system and method may allow coupling of both downstream hydromet and downstream smelting processes with an existing upstream concentrator operation, in order to maximize profits, while minimizing risk, and without necessarily having to make substantial changes to existing concentrator processes, chemistries, and/or mechanical infrastructures which might already be in place. In some embodiments, the downstream hydromet and downstream smelting processes may be provided in parallel, downstream of the upstream concentrator, and operatively connected together and to the upstream concentrator via diverter means, which may comprise any number of diverter mechanisms for liquid, semi-liquid, solid, and/or semi-solid concentrates as is described in more detail herein. In some preferred embodiments, only one of the two downstream hydromet and downstream smelting processes receive concentrate from the upstream concentrator at a given point in time. In some embodiments, diversion means provided between the upstream concentrator, and the two downstream processes may divert concentrate leaving the upstream concentrator, to one of the two downstream hydromet and smelting processes; for example, to one of the hydromet and smelting process, at any given time. Diversion of the concentrate between the two downstream processes may be based on grade of the concentrate, for example, based on a predetermined threshold, which is fixed, or otherwise governed by smelter economics and penalties based on grade and/or impurities. In some embodiments, all, most, or substantially all of the concentrate is diverted to either one of the two downstream hydromet and smelting processes at a given point in time; wherein the concentrate produced by the upstream concentrator may be diverted to the other of said either one of the two downstream hydromet and smelting processes.

For example, some embodiments of the inventive system and method may utilize a sorting step and associated sorting equipment, wherein the grade and/or impurities content of produced final copper concentrate leaving the concentrator may be measured periodically using analyzing means. The analyzing means may comprise for example, one or more analyzer devices configured to determine composition, grade, and/or impurities content of a concentrate, including, but not limited to: portable or mounted on-line elemental analyzers, X-ray Fluorescence (XRF) analyzers, X-ray fluorescence spectrometry equipment and methods, X-ray Diffraction (XRD) analyzers, X-ray diffraction spectrometry equipment and methods, manual laboratory equipment and methods for routine process control assays, qualitative and quantitative material characterization detectors, pressed powder analysis equipment, wavelength dispersive X-ray fluorescence (WDXRF) spectrometers, combinations thereof, and/or the like, without limitation.

A minimum acceptable threshold (e.g., a predetermined "cutoff" setting which may be used in a computer-control algorithm) relating to concentrate grade (e.g., % copper content) and/or impurity content (PPM/amount of concentrate) may also be set and/or fixed or adjusted over time, periodically. For example, a minimum acceptable grade threshold for copper grade may be permanently set to a value for use with a control algorithm, such as a grade value between 12 and 22% (e.g., 19% copper grade), or other minimum acceptable grade threshold value that would provide ideal or satisfactory economics for smelter feed concentrate products produced by a concentrator operation. It should be noted that in some instances, the selected minimum acceptable grade threshold may be set to be a value which is less than a required grade mentioned in a smelter contract, because the time-averaged grade of the concentrate above the selected minimum acceptable grade threshold may likely exceed the required grade mentioned in the smelter contract. It should also be noted that in some instances, the selected maximum acceptable impurities content threshold may be set to be a value higher than a maximum allowable concentration required by a smelter contract, because the time-averaged level of impurities within the concentrate may likely fall below the impurities concentration limit outlined in the smelter contract.

In some embodiments, so long as the produced final concentrate grade meets or exceeds a minimum acceptable grade threshold value, diverter means may send all (or a substantial portion, such as essentially all) of the final copper concentrate being produced, to a downstream smelter for smelting. In some embodiments, if the produced final concentrate grade fails to meet or fails to exceed the minimum acceptable grade threshold, the diverter means may divert all (or a substantial portion, such as essentially all) of the final copper concentrate being produced, to a downstream hydromet circuit, for further refining. In some embodiments, so long as the composition of the produced final concentrate does not exceed a maximum acceptable impurity concentration threshold value, diverter means may send all (or a substantial portion, such as essentially all) of the final concentrate being produced, to a downstream smelter for smelting. In some embodiments, if the composition of the produced final concentrate meets or exceeds the maximum acceptable impurity concentration threshold value, the diverter means may divert all (or a substantial portion, such as essentially all) of the final concentrate being produced, to a downstream hydromet circuit, for further refining. In some embodiments, the produced final concentrate may comprise a produced final copper concentrate, without limitation. In some embodiments, one or more of said minimum and/or maximum threshold values may be provided and included in algorithm supported by software which is configured to be ran on a computing device. The computing device may comprise a diverter controller or other controller for gathering and storing analysis data produced by analyzing means (e.g., composition over time), and/or for sending one or more control signals to the diverter means.

Embodiments of the hydromet circuit may comprise production means, such as an electrowinning unit for producing a saleable metal (e.g., copper). The electrowinning unit may be configured to produce London Metals Exchange (LME) Grade-A copper cathode, or cement/blister copper. Control systems and/or loop feedback mechanisms may be employed, without limitation, in order to fully automate any one or more of the measuring, analyzing, threshold setting, and diverting steps discussed herein.

For a mining and/or copper concentrate production operation having a copper concentrator, a preferred grade of a final copper concentrate for smelting may be determined (e.g., using information from a smelter contract, such as a minimum acceptable copper grade which can be accepted without penalty). Using the preferred grade of a final copper concentrate for smelting, a minimum acceptable grade threshold may be derived and set using the preferred grade, based on smelting economics, historical data, mine plan data, and/or based upon conditions or agreed terms defined within a smelter contract. It may be established that substantially all final copper concentrate leaving the copper concentrator which is at or above the minimum acceptable grade threshold, will be sent to a downstream smelting operation (whether owned by said mine and/or concentrator, or stored in a container for shipment and delivered to a third party smelter operation). It may further be established that substantially all final copper concentrate leaving the copper concentrator which is below the threshold, will be redirected (as necessary) and sent to a downstream hydrometallurgical process(es), instead of the smelting operation. The downstream hydrometallurgical process(es) may, for example, comprise a small 'add-on' leaching or SX/EW circuit, which may be a bench test-scale unit, a pre-feasibility test unit, a pilot test-scale unit, a feasibility test unit, a retrofit "island" unit, or full-production scale unit, without limitation. The downstream hydrometallurgical process(es) may be part of the mine and/or concentrator operation, but it is anticipated that the downstream hydrometallurgical process(es) may be operated by a third party which might not be affiliated with the mine and/or concentrator operation. It is also anticipated that the hydrometallurgical process(es) may optionally be located alongside the smelter. It is further anticipated that one or more analyzing operations may be used in order to determine when, or the frequency of changes to the flow direction of produced concentrate; wherein the one or more analyzing operations may determine the contents, grade, composition, and/or one or more impurity levels, without limitation. It is even further anticipated that one or more sorting operations may be conducted, for example, at the smelter site, prior to downstream processing. In such cases, analyzing means and/or diverter means may be provided to said smelter site prior to downstream processing. It is even further anticipated that one or more sorting operations may be conducted, for example, at the hydrometallurgical circuit, prior to downstream smelt-processing. In such cases, analyzing means and/or diverter means may be provided to said hydromet site prior to downstream smelt-processing.

Once an appropriate minimum acceptable grade threshold value or value range has been chosen, the final copper concentrate produced may be sent to a smelter if its grade is equal to or greater than the minimum acceptable grade threshold value. Alternatively, final copper concentrate produced may be sent to a smelter if its grade is within the prescribed minimum acceptable grade threshold value range. More alternatively, final copper concentrate produced may be sent to a hydrometallurgical process if its grade is below the minimum acceptable grade threshold value, or, if its grade is outside of the prescribed minimum acceptable grade threshold value range.

Similar methods and apparatus may be employed to limit and/or reduce the amount of impurities which might end up in a smelter feed concentrate and cause economic penalties. For example, an appropriate maximum acceptable impurity threshold value or acceptable impurity concentration value range may be chosen, and the final copper concentrate produced may be sent to a smelter if its respective impurity concentration is less than the maximum acceptable impurity threshold value or within the prescribed acceptable impurity concentration value range. More alternatively, final copper concentrate produced may be sent to a hydrometallurgical process if its impurity concentration is equal to or greater than the maximum acceptable impurity threshold value or outside of the prescribed acceptable impurity concentration value range.

While the use or employment of one or more slipstreams are anticipated, it is strongly preferred in some embodiments that substantially all of the produced final copper concentrate be directed entirely to only one of the smelting process or hydrometallurgical process at a given time. It is also strongly preferred in some embodiments that substantially all of the produced final copper concentrate is redirected back and forth between smelting and hydromet over time, as a function of the contents of the produced final copper concentrate (e.g., copper grade, impurities level, etc.).

In preferred embodiments, analyzing means for measuring the contents of produced final concentrate (e.g., an analyzer), and/or diverter means (e.g., diverting conveyor, diverting control valve) provided to the mine and/or concentrator operation may be configured for automation. Accordingly, components forming the analyzing means and/or diverter means may be controlled using programmable logic controllers (PLCs), computing devices supporting control software (e.g., a control module, a networked CPU, a control panel comprising an integrated circuit and a processor), and/or the like, without limitation. Said analyzing means for measuring the contents of produced final concentrate may, in some embodiments, continuously or intermittently measure and/or monitor the chemical or physical makeup of the produced final concentrate. For example, analyzing means may provide, without limitation, an intermittent or periodic recordation of the composition of a produced final concentrate, as a function of time, wherein readings may be taken at random or specific time intervals. The time intervals for the readings may be set based upon data obtained from a mine plan, without limitation.

Said diverter means may, in some embodiments, divert produced final copper concentrate from one of the two downstream processes (e.g., smelting or downstream hydrometallurgical process) to the other of the two downstream processes, and vice-versa. The diverter means may repeat the same for a number of times, to convey concentrate back and forth between the two downstream processes. Preferably, the produced final copper concentrate is sent to only one of the two downstream processes (e.g., smelting or downstream hydrometallurgical process) at a given point in time.

Some embodiments of the inventive approach may involve operating a concentrator to produce a single final copper concentrate product, as conventionally done; wherein on days when the concentrator product being produced is at or above a specified minimum acceptable grade threshold, the produced material may be designated for shipping to a smelter, as governed by the diverter means. For example, a control signal may be sent to a diverting mechanism to ensure that the produced material is sent to a shipping container (e.g., a train tank car) or sent to a smelting furnace which may be onsite or nearby. Alternatively, on days when the concentrator product falls below the specified minimum acceptable grade threshold, the concentrator product may be designated for treatment by a hydrometallurgical process (e.g., leach, SX/EW), as governed by the diverter means. For example, a control signal may be sent to a diverting mechanism to ensure that the produced material is sent to a downstream solvent extraction process which may be onsite or nearby. In preferred embodiments, the hydrometallurgical process may be configured to produce a saleable product, such as a metal cathode or blister metal product. In some embodiments, the specified minimum acceptable grade threshold may be chosen in such a way, so as to increase and/or maximize the profit to the mine, and maximize the amount paid per ton of final copper concentrate sent to a smelter by the mine and/or concentrator operation. More specific details on the economics may be gleaned from the drawings accompanying this application for patent.

It is foreseen that in some embodiments, a majority of the total concentrator product produced (e.g., final copper concentrate) may end up being sent to a smelter, whereas a relatively minor portion of the total concentrator product produced may end up being treated by a downstream hydrometallurgical process. This unevenness in proportion might occur, for instance, if there are far fewer days of low grade final copper concentrate production than of acceptable grade (i.e., economically viable for smelting) final copper concentrate production. Such an unevenness in proportion might also occur, for example, if there are far fewer days of high impurities concentration levels in produced final copper concentrate than of acceptable levels of impurities (i.e., economically viable for smelting). Such scenarios may be favorable, because they can reduce the necessary size, capacity, and/or operating cost expenditures of a downstream hydrometallurgical process, while still being able to enjoy the benefits of reduced or eliminated smelter penalties.

According to certain embodiments, an existing mine or concentrator may continue to produce only a single final copper concentrate product and divert it as a function of grade (or impurity concentration), rather than separately produce two independent and distinct high and low grade concentrate streams in parallel. Moreover, according to certain embodiments of the present technology, risks associated with the adoption of hydrometallurgical processes at existing copper sulfide mines/concentrators may be mitigated or eliminated altogether (in the sense that it may not be required to make any changes to the manner in which a concentrator is being operated). In other words, changes to upstream concentrator processes already taking place may not be necessary to implement embodiments discussed herein.

While changes to upstream concentrator processes already taking place may not be necessary to implement embodiments discussed herein, it is anticipated by the inventors that ordinary artisans and practitioners within the leaching arts could optionally make changes to upstream concentrator processes, for example in order to increase overall copper recovery. Such an optional change may include, for example, accepting a greater fraction of the concentrator's production to be at or below the minimum acceptable grade threshold.

Risks associated with adopting a brand new downstream hydrometallurgical process for an existing copper sulfide mine/concentrator may be further reduced, for example, by minimizing the amount of capital and operating costs. Capital and operating costs to an existing copper sulfide mine/concentrator may be reduced, for example, by providing the hydrometallurgical operation as a minimally-sized downstream hydrometallurgical circuit downstream of the concentrator. The hydrometallurgical circuit may even be configured as a full-size plant, a mini plant, a pilot plant, or a bench test-scale plant. Diverter means, which may include one or more diverter mechanisms such as a directional control valve or diverting sortation conveyor may be employed upstream of the hydrometallurgical circuit. The diverter means is preferably capable of segregating high-grade product from the total amount of concentrate product produced, which can be readied for smelting. The diverter means may be operatively engaged, e.g., on at least a daily basis or other frequency. On appropriate days, the diverter means may be configured to switch a flow direction and thereby segregate low grade product from the total amount of concentrate product produced and keep it from being sent to a smelter. The low grade product can be sent to said added minimally-sized hydrometallurgical process located downstream of the concentrator, rather than to the smelter for low grade concentrate production days.

According to some embodiments, the diverter means may comprise one or more flow control or material handling devices in any conceivable or practical combination, configuration, or permutation thereof. For example, flow control or material handling devices which may be selected to make up or configure diverter means may include, but not be limited to: one or more valves (e.g., one or more control valves, one or more manual valves), one or more conveyors or conveying devices (e.g., one or more diverting/diverter conveyors, one or more pipe conveyors, one or more chute conveyors, one or more chain-driven conveyors, one or more roller-driven conveyors, one or more slat conveyors, one or more flat belt conveyors, one or more magnetic belt conveyors, one or more troughed belt conveyors, one or more bucket conveyors, one or more screw conveyors, one or more pneumatic conveyors, one or more sortation conveyors, one or more diverting sortation conveyor devices, one or more tilting device sortation conveyors, one or more cross-belt transfer device sortation conveyors, one or more tripper conveying devices, one or more pivot divert conveyor devices), a manual-controlled directional control valve, an electrically-controlled directional control valve, various combinations thereof, or the like, without limitation.

In some preferred embodiments, for example, when a final produced concentrate product cannot be dry-conveyed, a hydraulic-type sorting device may be employed as diverter means or as a portion of diverter means. For example, a directional control valve may be provided as diverter means or as a portion thereof. According to some embodiments, the directional control valve may have a number of ports. For example, the directional control valve may comprise a two-way valve comprising one upstream "in" port and two downstream "out" ports, wherein a selector mechanism may divert the flow of the final produced concentrate between the two downstream "out" ports. In some embodiments, the selector mechanism may divert the flow of the final produced concentrate to only one of the two "out" ports at a time. In some embodiments, the directional control valve may comprise a number of positions (e.g., left or right). The directional control valve position may be utilized to divert the final produced concentrate product to only one of the following two downstream processes at a time: 1) a smelter process or a shipment container which is destined for a smelting process, and 2) a hydrometallurgical process comprising an optional solvent extraction and electrowinning circuit. According to some embodiments, the optional solvent extraction and electrowinning circuit may be on or near the same site as the concentrator producing the final produced concentrate product. According to some embodiments, the optional solvent extraction and electrowinning circuit may be distant to the concentrator producing the final produced concentrate product, or otherwise remotely positioned with respect to the concentrator producing the final produced concentrate product. According to some embodiments, the directional control valve may have one or more actuating methods and/or one or more spool types or positions.

In some instances, the total number of entry or exit ports connected to a control valve used as diverter means may vary. For example, the total number of entry or exit ports may vary depending on blending requirements for blending produced concentrates together to control overall compositional makeup of a concentrate. According to some embodiments, various types of control valves, such as two way, three way, and four way valves may be advantageously utilized as a portion of diverter means, and may form diverter means in its entirety, without limitation. Though preferred embodiments of the invention are thought to remove the inconveniences of blending concentrate, it is anticipated that higher grade final produced concentrate product may be analyzed, sorted, stored in one or more storage tanks operably communicating with one or more components forming the diverter means, and blended with lesser-grade final produced concentrate product. In some embodiments, the blending may occur prior to or after the step of diverting final produced concentrate product to either of a downstream smelting process or a downstream hydrometallurgical process (i.e., divert and then subsequently blend, or blend and then subsequently divert). It is also anticipated that lower grade final produced concentrate product may be analyzed, sorted, stored in one or more storage tanks operably communicating with one or more components forming the diverter means, and blended with higher-grade final produced concentrate product. In some embodiments, the blending may occur prior to or after the step of diverting final produced concentrate product to either of a downstream smelting process or a downstream hydrometallurgical process (i.e., divert and then subsequently blend, or blend and then subsequently divert). In this regard, multi-port directional control valves (DCVs) may be employed within certain embodiments of a concentrator/leach circuit according to the invention, in order to accomplish both blending and diverting functions, in any desirable manner or sequence.

In some embodiments, diverter means may employ at least one directional control valve (e.g., electrically-actuated; manually-actuated; spring-actuated; manually-operated with levers or paddles on which an operator may apply a force to operate the valve; spring-assisted; manual utilizing a lever or external pneumatic or hydraulic signal to return the spool; mechanically-operated which employs one or more cams, wheels, rollers, or the like; hydraulically-operated; pneumatically-operated; solenoid-operated spool-type; magnetic latch-type; sliding spool-type; cylindrical spool-type; rotary spool-type; spherical spool-type; combinations thereof; and/or the like), without limitation. Valves which may be used for the provision of diverter means may advantageously comprise any number of normal and working positions or configurations in which a valve spool may take (e.g., two position, three position, proportional valves, etc.), without limitation.

In some preferred embodiments, for example, when a final produced concentrate product can be dry-conveyed, a sorting mechanism may be employed within the circuit to serve as diverter means. The sorting mechanism may, for example, comprise one or more types of materials handling equipment, such as conveying equipment. For example, in some embodiments, one or more sortation conveyors, pivoting screw conveyors, or diverter conveyors may be utilized to move a conveyable final produced concentrate product to, from, and back and forth between a downstream smelting process or circuit and a downstream hydrometallurgical process or circuit, without limitation.

It should be understood that the diversion of a final produced copper concentrate product to, from, and back and forth between a downstream hydromet operation and downstream smelting operation may technically occur within a downstream portion of an upstream concentrator operation. It should also be understood that diversion of a final produced copper concentrate product may technically occur within an early portion of either of the downstream smelting operation or within an early portion of the downstream hydromet operation. It should further be understood that according to some embodiments, diversion of a final produced copper concentrate product may technically occur between: 1) an upstream concentrator operation and either one or both of: 2) a downstream hydromet operation, 3) a downstream smelting operation, without limitation.

Embodiments of the present inventive technology may involve the segregation of high and low quality day portions of a produced final copper concentrate stream via mechanical sortation, in a way which serves to maximize payments to the mine or concentrator, on a per-tonne of concentrate produced-basis. Based on a copper concentrate producer's plant metallurgical results for each day of production, the produced final copper concentrate may be set aside for shipment to the smelter if the produced final copper concentrate grade is equal to or greater than a chosen minimum acceptable grade threshold. If the produced final copper concentrate grade falls below the chosen predetermined minimum grade threshold (as measured by analyzing means), then the day's final copper concentrate production may be re-directed from shipment to the smelter and set aside for treatment by a downstream hydrometallurgical process. The hydrometallurgical process may include a solvent extraction circuit and/or an electrowinning circuit, without limitation. For example, the electrowinning circuit may be configured to produce either LME "Grade A" copper cathode(s), intermediate low-grade copper cathodes (e.g., blister copper, cement copper), and/or any other saleable copper product. According to some embodiments, the solvent extraction circuit may be used to create a (e.g., medium or high grade copper concentrate, a copper electrolyte, or a refined smeltable concentrate).

The aforementioned functionalities of a downstream hydrometallurgical process may have the positive effect of increasing a total combined average grade of produced final copper concentrate in the produced final copper concentrate being sent to the smelter, thereby reducing the transportation cost per pound of payable copper contained in the concentrate. In other words, if the minimum acceptable grade threshold is hypothetically set at 19% (without limitation), then the total combined average grade of produced final copper concentrate actually being sent to the smelter may be 23% copper (or another copper value which meets or exceeds smelting contract terms and conditions). The aforementioned functionalities of a downstream hydrometallurgical process may also have the positive effect of increasing the weight of payable copper, per tonne of concentrate produced.

The benefits of the disclosed inventive embodiments may further be appreciated by the following example based on simulated plant data given in FIG. 5.

EXAMPLE

The hypothetical, non-limiting, and exemplary production data shown in FIG. 5 is representative of simulated plant production data over a one month period with an assumed 80% availability of a concentrator, and a hypothetical annual copper cathode production of 25,000 tonnes. Moreover, in the example data shown in FIG. 5, the concentrator operating costs are assumed to be four U.S. Dollars per tonne of concentrate produced (i.e., $4/tonne). In this example, the copper cathode may be assumed to be either LME Grade copper cathode, or it may assumed to be an intermediate, mid to low-grade cathode product.

In the illustration, it can be assumed that a concentrator is paid according to the terms of a typical industry smelting contract containing treatment charges (TC), refinery charges (RC), and deductions to payable copper (e.g., for impurities), if the assay is below a contract-specified level (e.g., if the average copper assay is less than 22%, then deduct 1.1%; and/or if the copper content is less than 32%, then pay for 96.5%, subject to a minimum deduction of 1%). It is envisaged that other smelting contract terms and/or conditions may apply which could affect smelter economics, and which can be taken into consideration when setting a minimum acceptable grade threshold in accordance with the practices taught herein. The minimum acceptable grade threshold may determine when diverter means is activated, may control a directional path of the produced final copper concentrate between a downstream smelter and a downstream hydrometallurgical circuit, and may therefore ultimately control the composition of concentrates going to a smelter, vs. hydromet.

In the present non-limiting hypothetical example, it is apparent that the simulated concentrator can realize a 0.1% gain in payable copper using an embodiment of the inventive method, to increase the copper assay from 20.14% to over 22% without making any alterations to the existing processes within the upstream concentrator. In other words, by adding an analyzer to measure the contents of produced concentrate and by further adding a diverter to a concentrator in order to move concentrate to either a smelting operation or to a hydromet circuit based upon said contents as it relates to a smelter contract, mine plan, and/or control algorithm, smelting economics can be improved.

In other terms, embodiments the inventive system and method may be used to increase a profit per tonne of concentrate shipped to a smelter by first sorting a relatively small amount of low-grade material from the concentrator product (e.g., produced final copper concentrate) and then processing the low-grade material by a method other than smelting (e.g., downstream hydrometallurgical processing). According to some embodiments, the concentrate sorting may be made on the basis of a minimum acceptable grade threshold, which is the assay grade at (or above) which the concentrate is shipped or otherwise conveyed to the smelter. According to some embodiments, the concentrate sorting may be made on the basis of a maximum acceptable impurity concentration level threshold, which is the assay impurity concentration level below which, the concentrate may be shipped or otherwise conveyed to the smelter, and at or above which, the concentrate is shipped or otherwise conveyed to the smelter.

In this illustrative hypothetical example, the net value (i.e., NV) per tonne of concentrate shipped to the smelter may be calculated using the following equation:

$$NV = CP \times PC - (CC + SC + TC + RC)$$

Where:
NV=Net Value to the mine/concentrator operation per DMT (Dry metric ton) of concentrate that is shipped to the smelter,
CP=Contract Price (e.g., $6613.80 per tonne of payable copper, without limitation),
PC=Amount of Payable Copper per DMT (e.g., If the assay is less than 22%, deduct 1.1%, if the copper content is less than 32%, then pay for 96.5%, subject to a minimum deduction of 1%, without limitation),
CC=Concentrator operating cost (e.g., calculated on the basis of $4/tonne of feed, without limitation),
SC=Shipping Charge (e.g., $100 per DMT, and the concentrate is assumed to have a moisture content of 12%, without limitation),
TC=Treatment Charge (e.g., $105 per DMT, without limitation), and,
RC=Refinery Charge (e.g., $0.105 per lb. of payable copper, the higher the copper content the higher the refinery charge, without limitation).

For simplicity, in this example, it is also assumed that no impurities which would introduce penalty elements (e.g., arsenic) are present within the copper concentrate produced. Also for simplicity, it is assumed that there are no precious metals (e.g., gold, silver) present in the concentrate which would result in smelter credits. However, it should be understood that further evaluations of the copper concentrate produced which would factor in impurity concentration levels and/or precious metals content could be made using an analyzer during analyzing/measuring steps. It should also be understood that a minimum acceptable grade threshold may be set independently, or it may be set taking into consideration expected deductions for one or more penalty elements and/or expected credits for one or more precious metals found within the produced copper concentrate.

Figure 2:
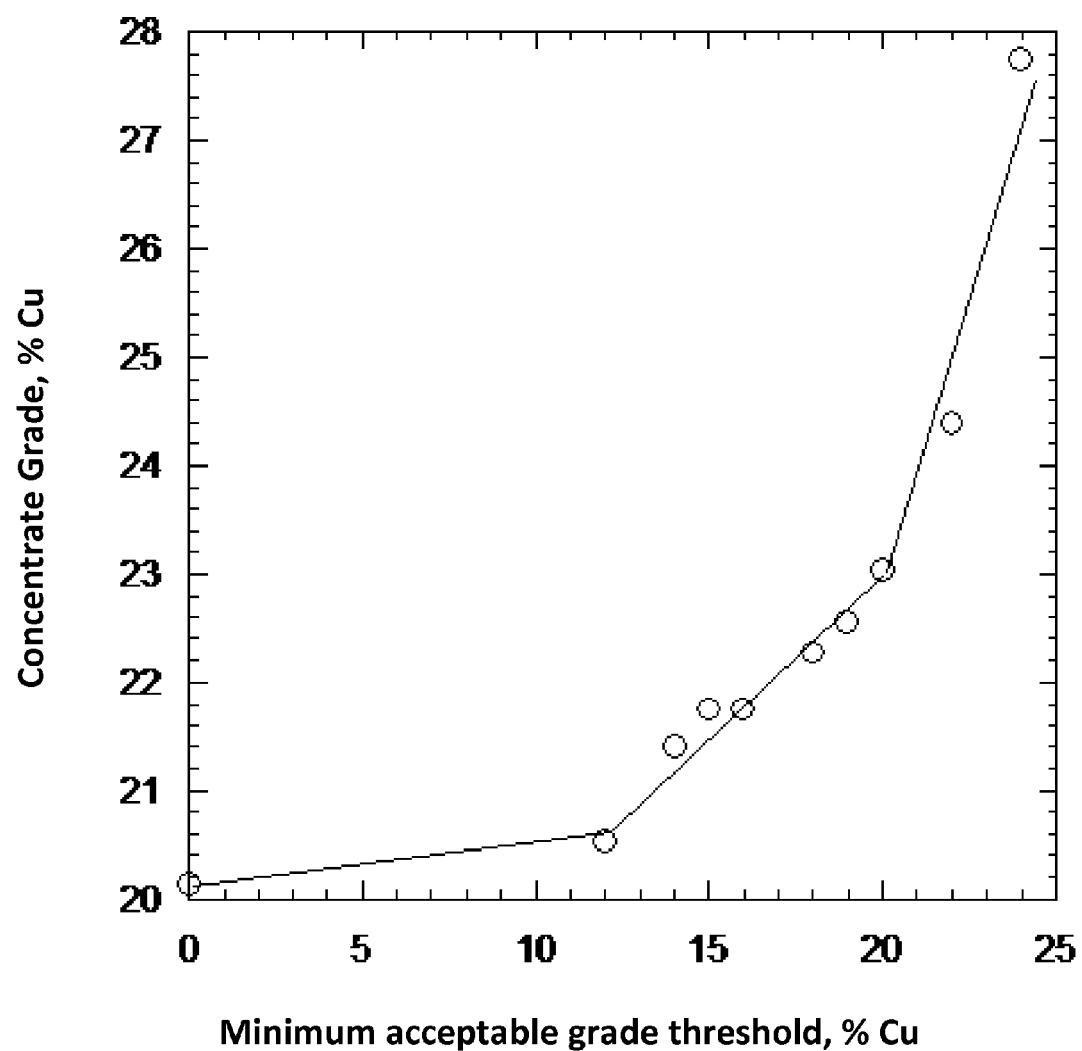
FIG. 2 is a hypothetical, illustrative, and non-limiting graph showing the effect on produced final copper concentrate grade values (in % copper), as a function of minimum acceptable grade threshold (% copper) which may be set, according to some embodiments, wherein the minimum acceptable grade threshold may be adjusted and/or set to affect the control of diverter means.
Figure 3:
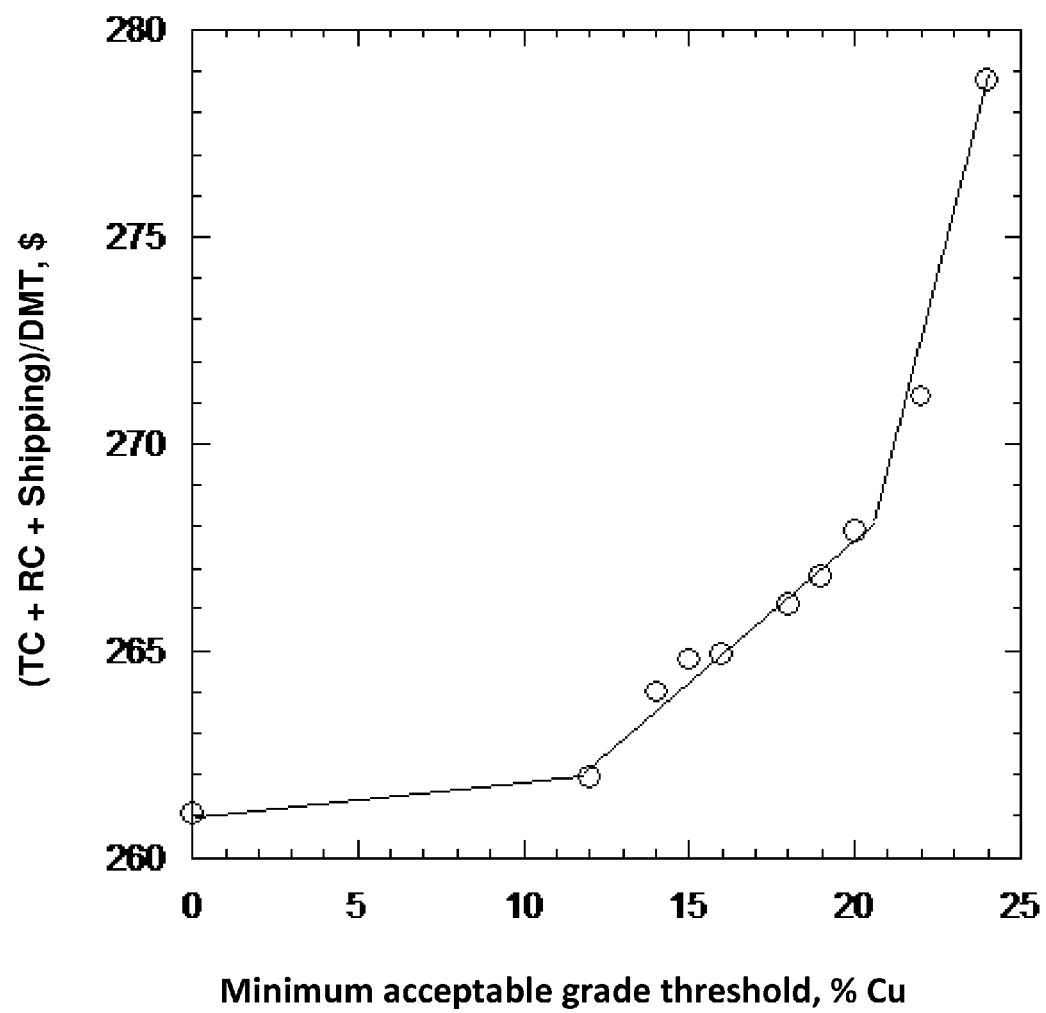
FIG. 3 is a hypothetical, illustrative, and non-limiting graph showing the effect on the combined costs per Dry Metric Ton (DMT), as a function of minimum acceptable grade threshold (% copper) which may be set; wherein the combined costs may generally include shipping charges, (e.g., estimated at $100 per DMT at an assumed moisture content of 12%), treatment charges (e.g., estimated at $105 per DMT), and refinery charges (e.g., estimated at $0.105 per lb. of payable copper), according to some embodiments, wherein the minimum acceptable grade threshold may be adjusted and/or set to affect the control of diverter means.

In FIG. 1, the relationship between Net Value (NV) and a minimum acceptable grade threshold of a produced concentrate is shown. It can be gleaned from FIG. 1, that increasing the minimum acceptable grade threshold may have the general effect of improving net value (NV) of the produced concentrate. As expected, this trend reflects the increasing concentrate grade obtained as the minimum acceptable grade threshold is increased (see FIG. 2). The data in FIG. 3, (TC+RC+SC) suggests similar increases, as a function of the minimum acceptable grade threshold, since the Refinery Charges (RC's) increase as the copper grade of the total combined average grade of produced final copper concentrate increases.

Figure 4:
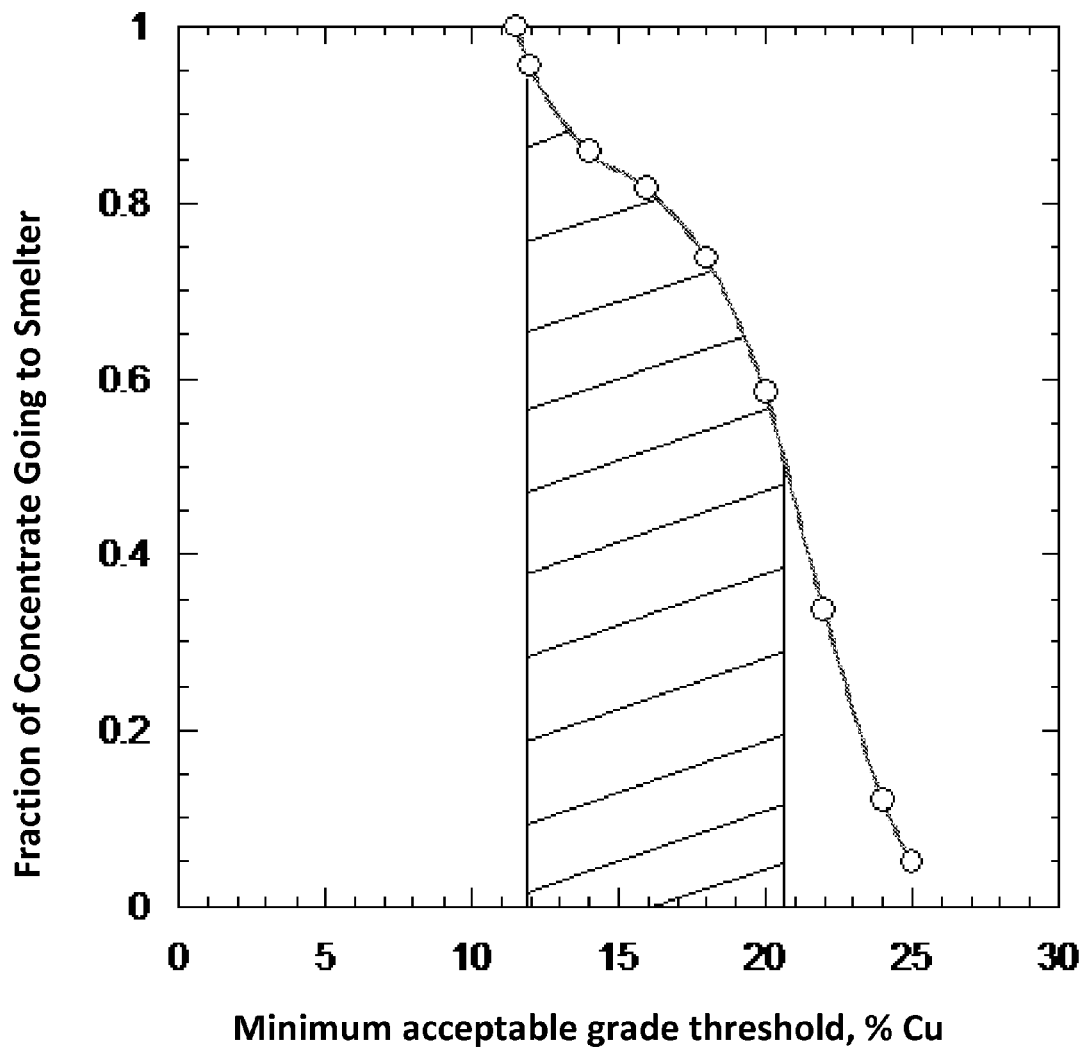
FIG. 4 is a hypothetical, illustrative, and non-limiting graph showing the effect on the total fraction of the concentrator product (i.e., produced final copper concentrate) going to a smelter, over a period of time, as a function of minimum acceptable grade threshold (% copper), according to some embodiments, wherein the minimum acceptable grade threshold may be adjusted and/or set to affect the control of diverter means; and wherein at any given period in time, all of the concentrator product (i.e., produced final copper concentrate) is sent to either a smelter, or to a downstream hydrometallurgical operation. It should be understood that where used herein, the term "all" may not necessarily include negligible or residual concentrate or account for minor leakage or spillage.
Figure 7A:
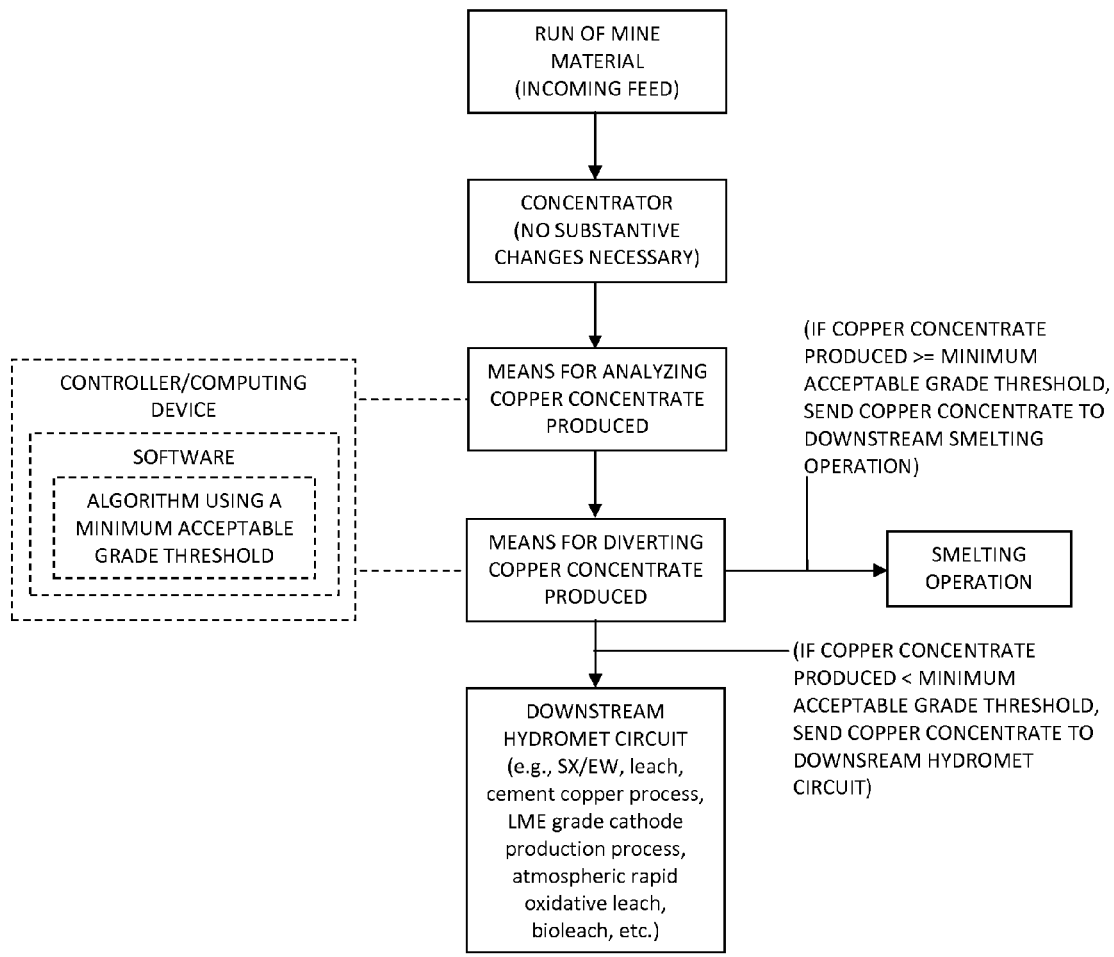
FIG. 7a is a non-limiting schematic illustration of a concentrator circuit/system configured to selectively sort produced final copper concentrate according to grade, and process it differently, for example, as a function of analyzed/measured grade of the produced final copper concentrate, with respect to a minimum acceptable grade threshold, according to some non-limiting embodiments.
Figure 7B:
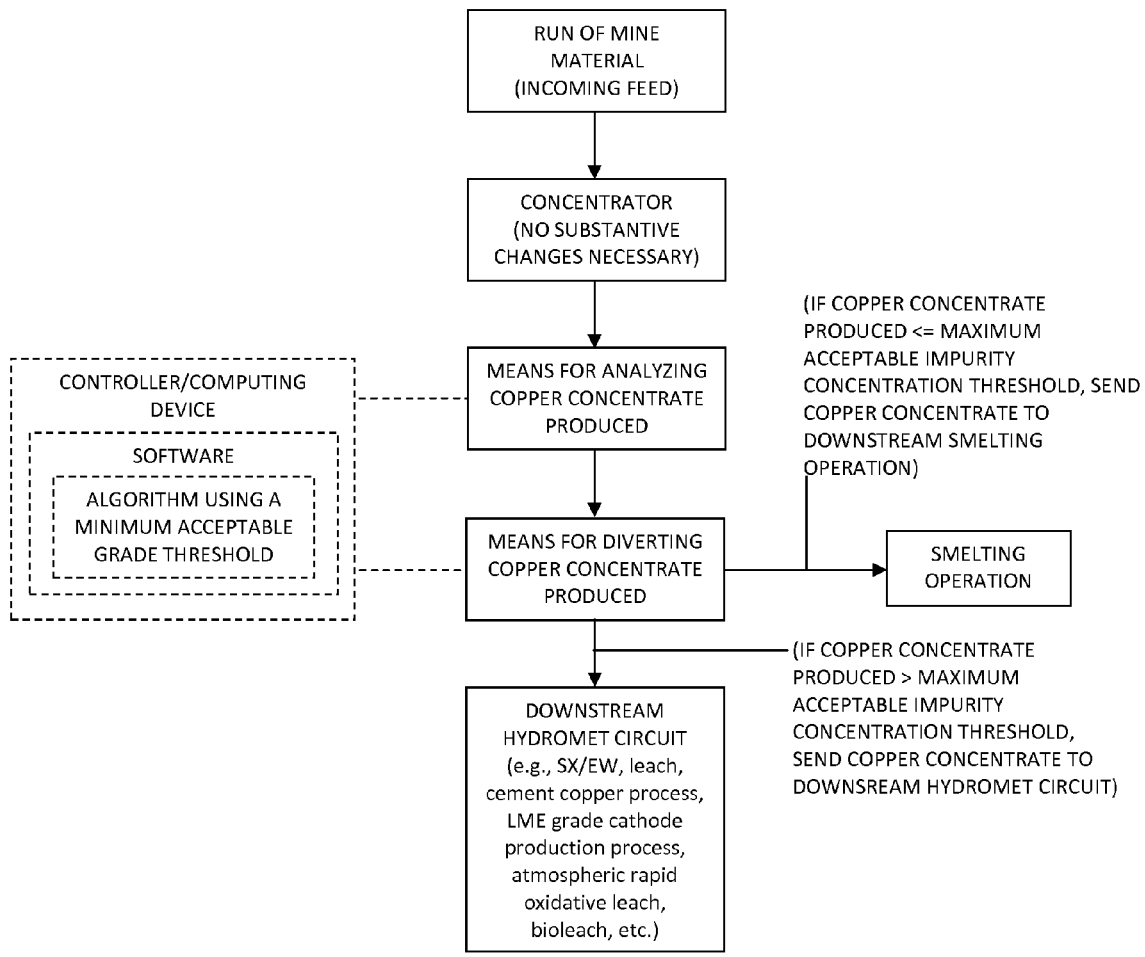
FIG. 7b is a non-limiting schematic illustration of a concentrator circuit/system configured to selectively sort produced final copper concentrate according to impurities concentration level(s), and process it differently, for example, as a function of analyzed/measured concentration of one or more impurities of the produced final copper concentrate, and with respect to a maximum acceptable impurities concentration threshold, according to some non-limiting embodiments.
Figure 7C:
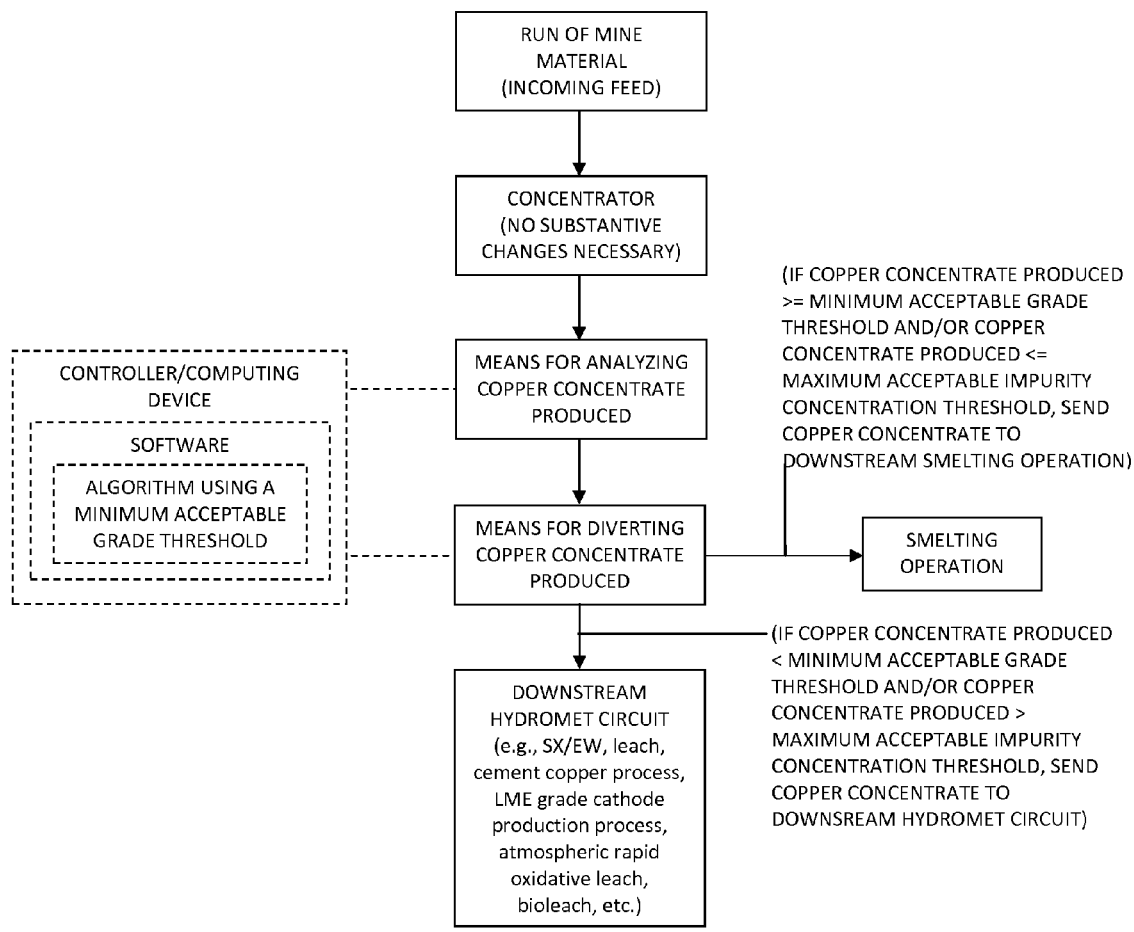
FIG. 7c is a non-limiting schematic illustration of a concentrator circuit/system according to some non-limiting embodiments which is configured to selectively sort produced final copper concentrate according to impurities concentration and/or according to grade, and process it differently, for example, as a function of respective analyzed/measured concentration of impurities of the produced final copper concentrate and/or as a function of grade of the produced final copper concentrate, with respect to a respective maximum acceptable impurities concentration threshold and/or with respect to a minimum acceptable grade threshold.
Figure 8:
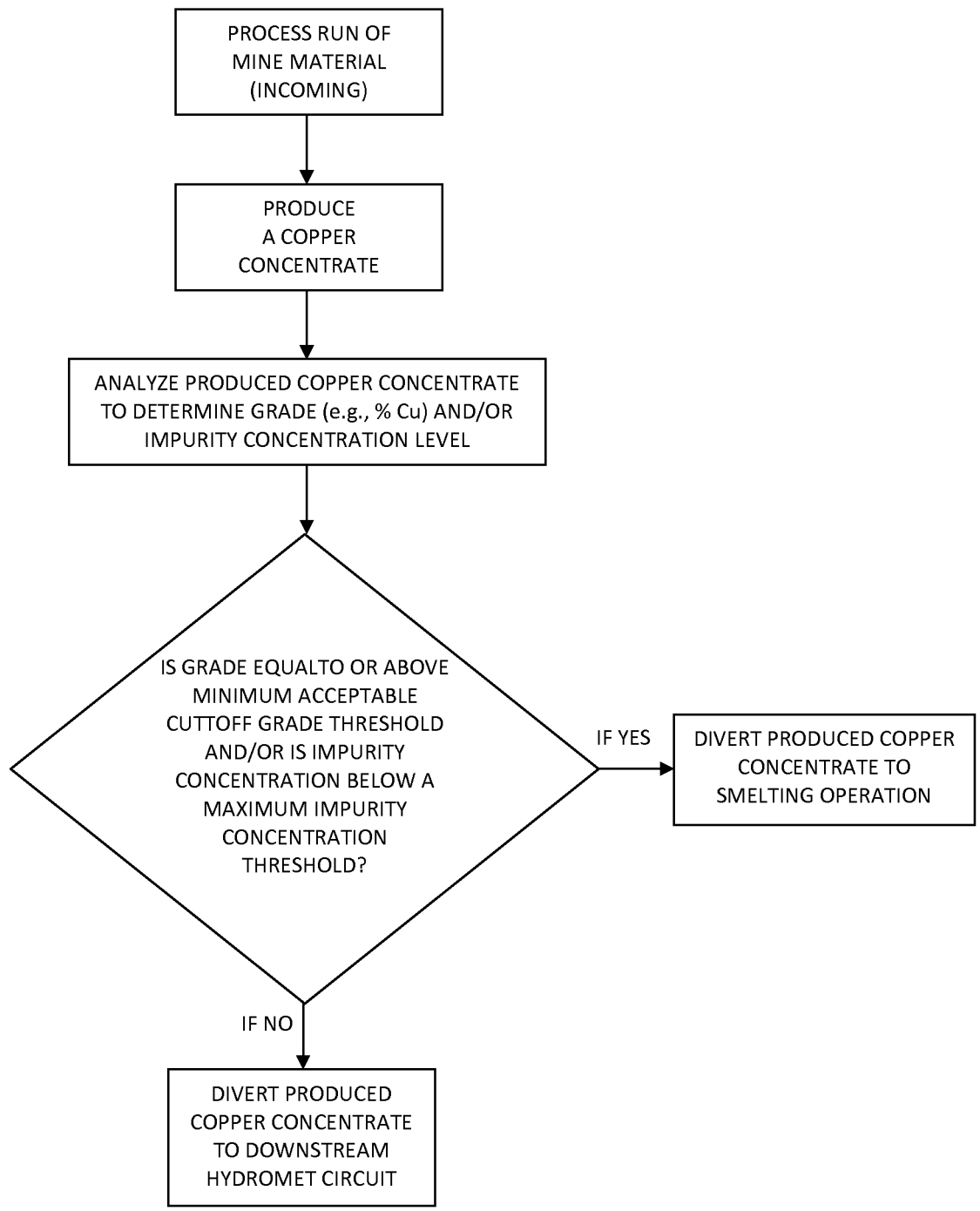
FIG. 8 is a non-limiting schematic illustration of a method of selectively sorting produced final copper concentrate, and processing it differently, as a function of analyzed/measured grade of the produced final copper concentrate, with respect to a minimum acceptable grade threshold, and/or as a function of impurity level, with respect to a maximum acceptable impurities concentration threshold.
Figure 9:
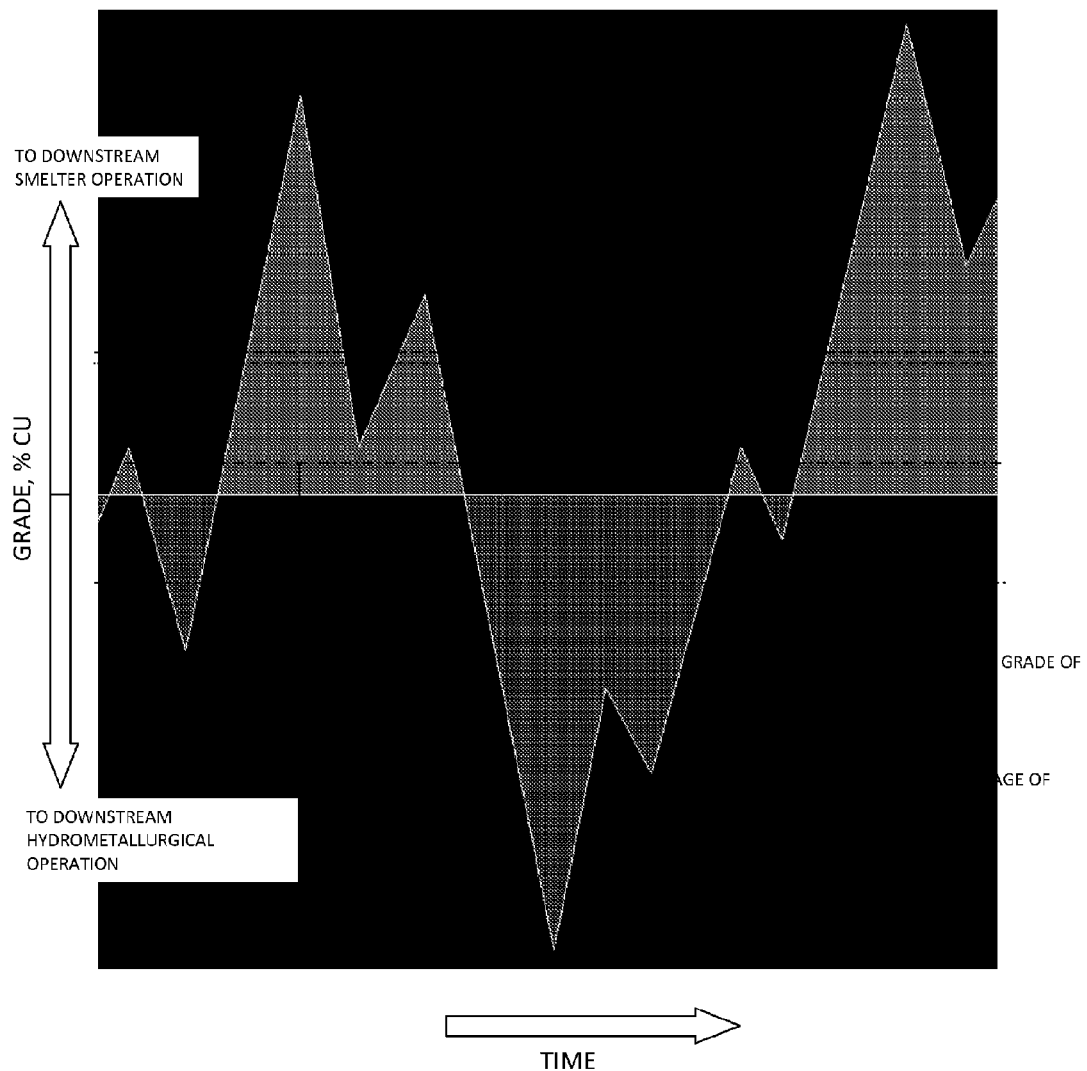
FIG. 9 is a non-limiting schematic illustration of a set minimum acceptable grade threshold, and its effect on: 1) a total combined average grade of produced final copper concentrate which is sent to a downstream smelter operation, and 2) a total combined average grade of produced final copper concentrate which is sent to a downstream hydrometallurgical operation; wherein a similar schematic could be provided with a set maximum acceptable impurities concentration threshold, and its effect on: 1) a total combined average impurities concentration level of produced final copper concentrate which is sent to a downstream smelter operation, and 2) a total combined average impurities concentration level of produced final copper concentrate which is sent to a downstream hydrometallurgical operation.
Figure 10:
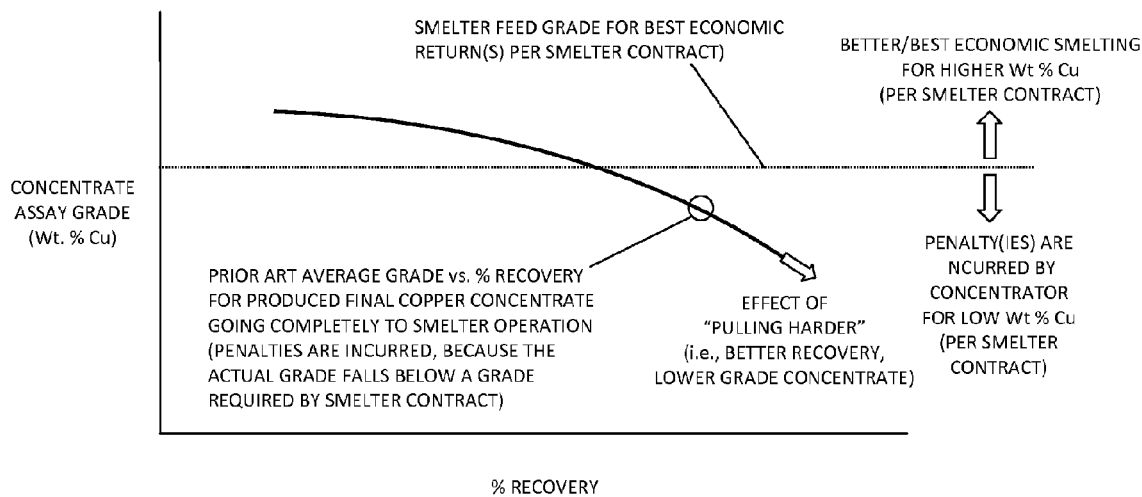
FIG. 10 is a schematic illustrating a grade vs. recovery curve typical of the prior art, which suggests a hypothetical poor grade output scenario which might occur while running a conventional concentrator. As shown, economic penalties may be incurred when pulling harder in the flotation circuit to provide higher recovery at the expense of a lower grade concentrate. Also as shown, a total combined average grade of produced final copper concentrate which is sent to a smelter operation can fall short of best smelting economics by not being in compliance with a minimum acceptable grade value (% metal) indicated on a smelter contract.
Figure 11:
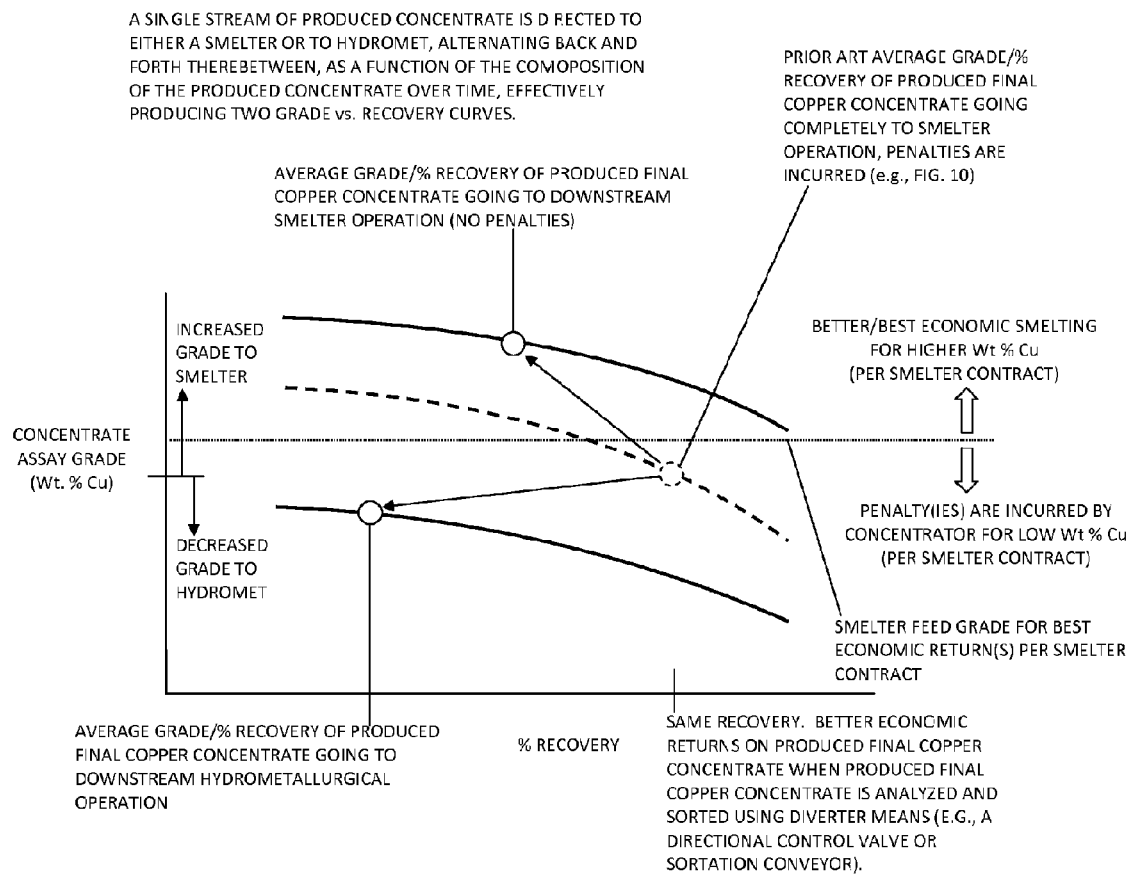
FIG. 11 is a non-limiting schematic illustration suggesting recovery and grade curves and projected values for both: 1) a total combined average grade of produced final copper concentrate which is sent to a downstream smelter operation, and 2) a total combined average grade of produced final copper concentrate which is sent to a downstream hydrometallurgical operation according to certain embodiments of the invention; wherein, the overall recovery of the produced final copper concentrate may remain approximately the same as what is shown in FIG. 10; however, smelter penalties are mitigated or avoided altogether by virtue of: 1) analyzing the produced final copper concentrate to determine its composition, 2) determining if the composition of the produced final copper concentrate meets or exceeds the requirements of a smelter contract or if the produced final copper concentrate will economically suffice per said requirements of a smelter contract, 3) sorting the produced final copper concentrate using diverter means which operates according to a chosen minimum acceptable grade threshold (which may be used with an algorithm supported by software installed on a computing device that controls the operation of one or more components which make up the diverter means), 4) sending the produced final copper concentrate to a smelter if its composition is appropriate for economical smelting based on its composition (e.g., its copper grade or impurities content) in relation to requirements defined in a smelter contract; or, instead, sending the produced final copper concentrate to a hydrometallurgical circuit if its composition is not appropriate for economical smelting based on its composition (e.g., its copper grade or impurities content) in relation to requirements defined in a smelter contract. Consequently, a total combined average of produced final copper concentrate which is selected to be sent to a downstream smelter operation, may meet or exceed a target grade value for best smelting economics, in accordance with a smelter contract, and overall net value to the concentrator may be increased (even though the time-averaged grade of produced final copper concentrate may actually be lower than a target grade value for best economic returns per a smelter contract).
Figure 12:
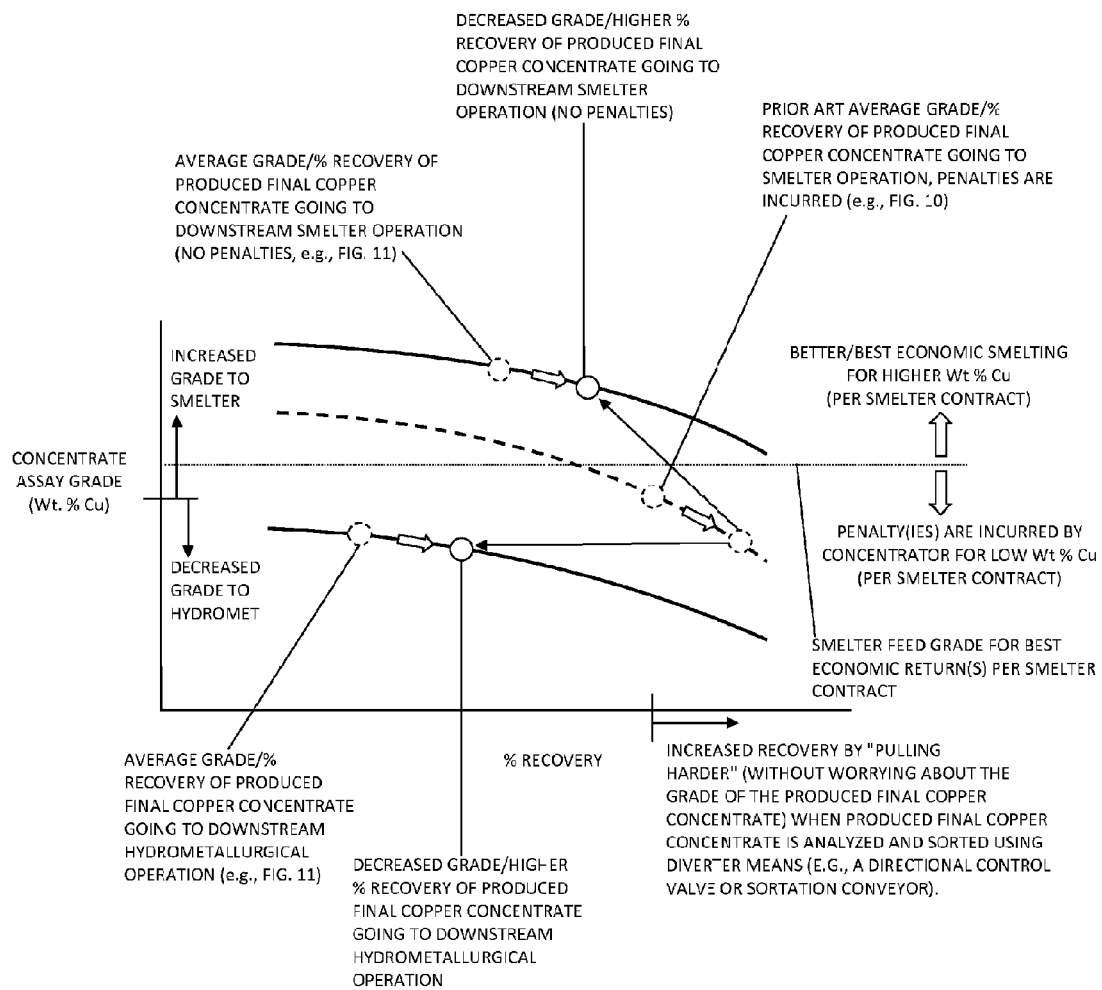
FIG. 12 is a non-limiting schematic illustration suggesting recovery and grade curves and projected values for both: 1) a total combined average grade of produced final copper concentrate which is sent to a downstream smelter operation, and 2) a total combined average grade of produced final copper concentrate which is sent to a downstream hydrometallurgical operation according to certain embodiments of the invention; wherein, the overall % copper recovery may be further increased from what is shown in FIG. 11, by "pulling harder" in the flotation circuit of a concentrator; wherein accordingly, more copper may be produced and sold for profit; and wherein smelter penalties can still be avoided so long as the time-averaged grade of the stream of concentrate (during and over the periods that it is sent to a smelter operation instead of a hydromet operation) remains above smelter contract requirements.
Figure 13:
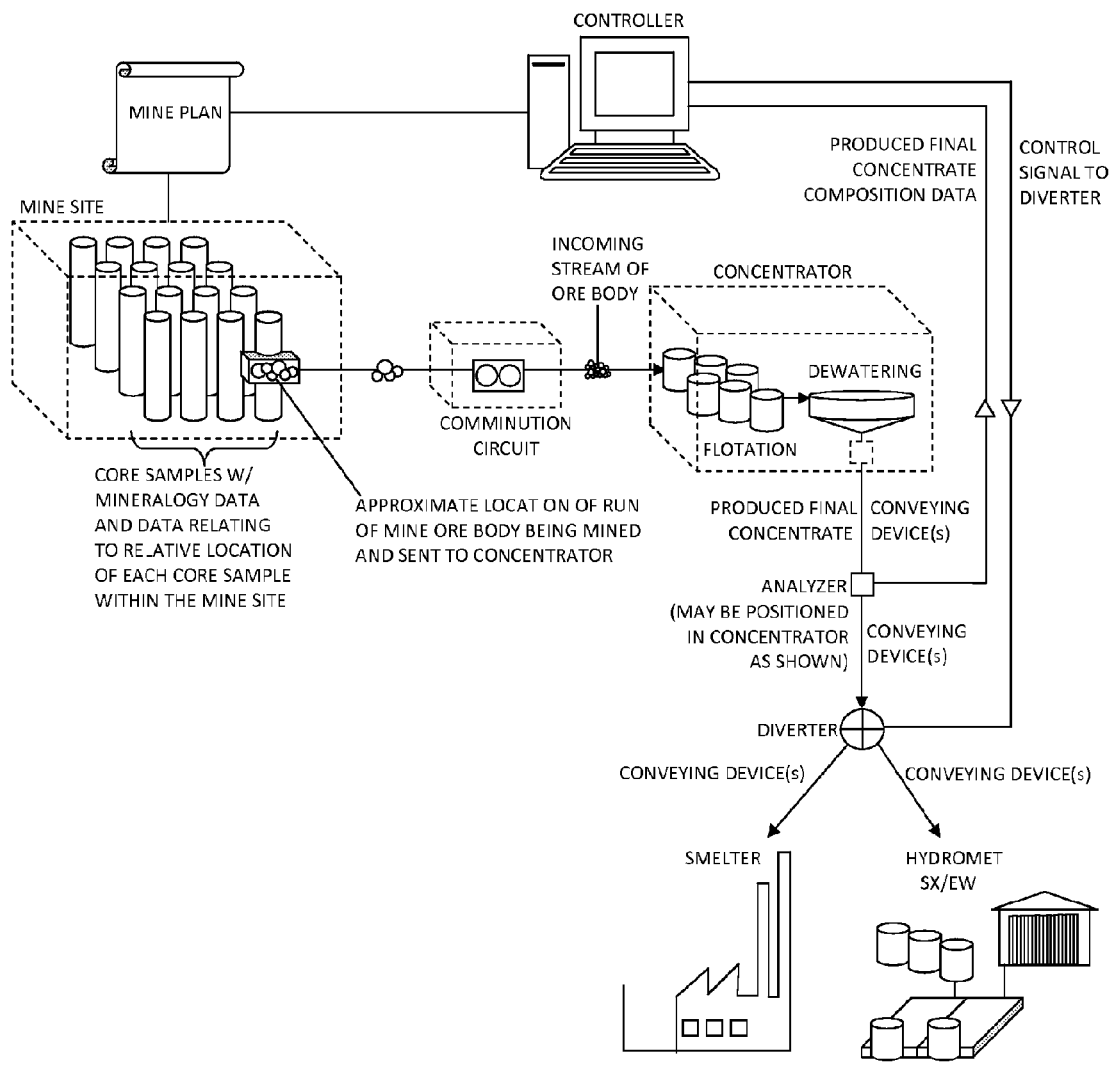
FIG. 13 is a non-limiting schematic illustration suggesting a possible flowsheet according to some embodiments, wherein produced final copper concentrate may be diverted to one of a smelter or hydrometallurgy circuit, depending on its contents (e.g., grade (% Cu) and/or level of impurities (e.g., arsenic)) at a given point in time; and wherein the produced final copper concentrate may be diverted to the other one of a smelter or hydrometallurgy circuit, as its contents (e.g., grade (% Cu) and/or level of impurities (e.g., arsenic)) changes over time; for example, wherein a diverter iteratively directs a stream of produced final copper concentrate back and forth between feeding a downstream smelter operation and feeding a downstream hydrometallurgical operation.

An example of the fraction of the concentrator product (i.e., produced final copper concentrate) going to the smelter, as a function of the set minimum acceptable grade threshold (% Cu) can be seen in FIG. 4. An inventive aspect of some embodiments of the present invention may be represented by the crosshatched area bounded within the vertical lines. It will be understood by those skilled in the art, that the minimum acceptable grade threshold which defines certain preferred embodiments of the invention, may be a function of the measured final copper concentrate grade. In this regard, the amount of final copper concentrate being sent to the smelter may be equal to or greater than 50% of the total copper concentrator output (i.e., wherein 50% or more of the produced final copper concentrate being produced over a period of time by a copper concentrator is sent to a smelting operation). According to some preferred embodiments, the minimum acceptable grade threshold can be set at a value which is equal to, or greater than, the minimum final copper concentrate grade produced by the concentrator, although setting the minimum acceptable grade threshold to an arbitrary value to maximize smelting profits or minimize smelting penalties according to a smelting contract is envisaged.

It should be known that the particular features, processes, and benefits which are shown and described herein in detail are purely exemplary in nature and should not limit the scope of the invention. For example, embodiments disclosed may exhibit one or more downstream hydrometallurgy circuits that comprise any one or more of: leaching equipment and/or components thereof, solvent extraction (SX) equipment and/or components thereof, electrowinning (EW) equipment and/or components thereof, or the like. Moreover, embodiments disclosed may exhibit one or more downstream hydrometallurgy circuits that comprise equipment and/or components thereof which are capable of producing, for instance, LME Grade A copper cathode from a copper-containing electrolyte. In some non-limiting embodiments, the one or more downstream hydrometallurgy circuits may comprise a rapid oxidative leach (ROL) process, without limitation. In some non-limiting embodiments, the one or more downstream hydrometallurgy circuits may include apparatus for rapid oxidative leaching (ROL) and/or components associated therewith, without limitation. In some non-limiting embodiments, the one or more downstream hydrometallurgy circuits may comprise a subsequent precious metals recovery process which is operatively positioned downstream of said rapid oxidative leach process, along with related apparatus and components associated therewith. It should be understood that the one or more downstream hydrometallurgy circuits may be provided as a "kit", plant "island", or portable equipment "skid", and/or may be added to an existing concentrator operation as a retrofittable solution to said existing concentrator (i.e., as a "retrofit" system). In certain more preferred embodiments, an existing concentrator operation need not be altered in order to employ some of the inventive features and concepts disclosed herein and enjoy the benefits of the added one or more downstream hydrometallurgy circuits according to the teachings throughout this disclosure.

Although the invention has been described in terms of particular embodiments and applications, one of ordinary skill in the art, in light of this teaching, can generate additional embodiments and modifications without departing from the spirit of or exceeding the scope of the claimed invention. For example, while "copper" is mentioned throughout this disclosure for describing types of assays, grades, concentrates, concentrators, etc., it should be readily understood that the inventive features and concepts of the disclosed technology may be equally employed and practiced with other types of minerals, materials, or metal sulphides to extract values other than copper. Additionally, in some embodiments, tailings leaving an add-on downstream hydrometallurgy circuit (e.g. leach residue) which may contain precious metals therein, may be sold to a roaster or autoclave as fuel, depending on the pyrite or elemental sulfur contents of the tailings. In such embodiments, a concentrator circuit may be further improved by potentially reducing and/or eliminating the amount of residual tailings in need of storage or disposal. In yet another example, according to further embodiments, a cement copper process and/or a blister copper process may be employed as a portion of or as an extension of a downstream hydrometallurgical circuit designed to process produced copper concentrates which fail to meet the minimum acceptable grade threshold for economical smelting per a smelting contract. It should be further understood that for any of the embodiments mentioned herein, as well as for the appending claims, the term "smelter" may be replaced or used interchangeably with the word "roaster", and the term "smelting" may be replaced with or used interchangeably with the word "roasting", without limitation.

Accordingly, it is to be understood that the drawings and descriptions herein are proffered by way of example to facilitate comprehension of the invention and should not be construed to limit the scope thereof.

What is claimed is:

1. A method of operating a copper concentrator comprising:
   (a) providing a copper concentrator which is configured to produce a single copper concentrate stream from an ore body feed stream feeding the copper concentrator;
   (b) producing the single copper concentrate stream from the ore body feed stream via the copper concentrator; the single copper concentrate stream feeding a downstream smelting operation or a downstream hydrometallurgical operation depending on a grade value of copper concentrate in the single copper concentrate stream; the downstream smelting operation and the downstream hydrometallurgical operation being provided downstream of a flotation circuit within the copper concentrator;
   (c) periodically analyzing the copper concentrate to obtain the grade value;
   (d) sending substantially all of the copper concentrate to the downstream smelting operation at times when the grade value is at or above a minimum grade threshold; and
   (e) sending substantially all of the copper concentrate to the downstream hydrometallurgical operation, at times when the grade value is below or falls below said minimum grade threshold;
   wherein the downstream hydrometallurgical operation is configured to produce copper cathode from the copper concentrate.

2. The method of claim 1, wherein the minimum grade threshold is between approximately 10 and 25%.

3. The method of claim 1, wherein the ore body feed stream comprises a mineralogy which varies over time; and wherein steps (d) and (e) occur after steps (a), (b), and (c) as a function of a percent change in the mineralogy of the ore body feed stream.

4. The method of claim 3, wherein the percent change in the mineralogy is determined from one or more analyzers which are configured to detect relative changes in mineralogy of the ore body feed stream.

5. A method of operating a metal sulfide concentrator comprising:
   (a) providing a metal sulfide concentrator which is configured to produce a single metal concentrate stream from an ore body feed stream feeding the metal sulfide concentrator;
   (a) producing the single metal concentrate from the ore body feed stream, via the metal sulfide concentrator; the ore body feed stream comprising an ore body having a mineralogy which varies over time; the single metal concentrate stream feeding a downstream smelting operation or a downstream hydrometallurgical operation depending on a grade value or impurity concentration level of metal concentrate in the single metal concentrate stream; the downstream smelting operation and the downstream hydrometallurgical operation being provided downstream of a flotation circuit within the metal sulfide concentrator;

(b) determining a minimum acceptable grade threshold and/or a maximum acceptable impurity concentration threshold;
(c) periodically analyzing the metal concentrate to obtain the value or impurity concentration level;
(d) sending substantially all of the metal concentrate to the downstream smelting operation at times when the grade value is at or above the minimum acceptable grade threshold and/or if the impurity concentration level is below or falls below the maximum acceptable impurity concentration threshold; and
(e) sending substantially all of the metal concentrate to the downstream hydrometallurgical operation, at times when the grade value is below or falls below said minimum acceptable grade threshold and/or if the impurity concentration level is at or above the maximum acceptable impurity concentration threshold.

* * * * *